(12) United States Patent
Xie

(10) Patent No.: US 12,538,389 B1
(45) Date of Patent: Jan. 27, 2026

(54) HEATING PAD AND SYSTEM

(71) Applicant: Guangsen Xie, Maoming (CN)

(72) Inventor: Guangsen Xie, Maoming (CN)

( * ) Notice: Subject to any disclaimer, the term of this patent is extended or adjusted under 35 U.S.C. 154(b) by 0 days.

(21) Appl. No.: 19/277,535

(22) Filed: Jul. 23, 2025

Related U.S. Application Data

(63) Continuation-in-part of application No. PCT/CN2025/107029, filed on Jul. 4, 2025, and a continuation-in-part of application No. PCT/CN2025/074806, filed on Jan. 24, 2025.

(30) Foreign Application Priority Data

| Jan. 14, 2025 | (CN) | ............... 202510058230.1 |
| Jan. 14, 2025 | (CN) | ............... 202520084257.3 |
| Jul. 3, 2025 | (CN) | ............... 202521385041.7 |

(51) Int. Cl.
| H05B 3/34 | (2006.01) |
| B32B 3/04 | (2006.01) |
| B32B 3/18 | (2006.01) |
| B32B 3/26 | (2006.01) |
| B32B 27/06 | (2006.01) |
| H05B 1/02 | (2006.01) |

(52) U.S. Cl.
CPC .......... *H05B 3/34* (2013.01); *B32B 3/04* (2013.01); *B32B 3/18* (2013.01); *B32B 3/266* (2013.01); *B32B 27/06* (2013.01); *H05B 1/0252* (2013.01); *B32B 2307/302* (2013.01); *B32B 2307/304* (2013.01)

(58) Field of Classification Search
None
See application file for complete search history.

(56) References Cited

U.S. PATENT DOCUMENTS

| 2,866,066 A * | 12/1958 | Neely ............... A01K 1/0158 |
| | | 219/547 |
| 2,932,687 A * | 4/1960 | Cook ............... H01B 11/203 |
| | | 248/68.1 |
| 3,041,441 A * | 6/1962 | Elbert ............... H05B 3/342 |
| | | 219/541 |
| 3,114,825 A * | 12/1963 | Kilburn ............ A47C 21/048 |
| | | 338/214 |
| 3,391,432 A * | 7/1968 | Durocher ........... H01B 7/08 |
| | | 24/339 |
| 3,825,672 A * | 7/1974 | Malon ............... B62D 1/28 |
| | | 174/97 |

(Continued)

FOREIGN PATENT DOCUMENTS

CN 217744141 U 8/2022

*Primary Examiner* — Thor S Campbell
(74) *Attorney, Agent, or Firm* — JEEN IP LAW, LLC

(57) ABSTRACT

A heating pad includes an operation region and a heating region fixedly connected to the operation region. The operation region includes a circuit board and an operation interface electrically connected to the circuit board. The heating region includes a heating wire. The operation interface sends an electric signal to the circuit board to control the temperature of the heating wire to reach a preset desired temperature. Multiple gears do not need to be arranged, and the desired temperature is preset, such that the heating process of the whole heating pad is simpler and more intelligent; and the heating pad has a good heating effect and good safety performance.

21 Claims, 35 Drawing Sheets

(56) References Cited

U.S. PATENT DOCUMENTS

| | | | | |
|---|---|---|---|---|
| 3,874,910 | A * | 4/1975 | Altmann | F24D 3/141 |
| | | | | 174/138 R |
| 3,961,157 | A * | 6/1976 | Miller | F24C 7/062 |
| | | | | 392/435 |
| 3,976,855 | A * | 8/1976 | Altmann | F24D 13/022 |
| | | | | 219/532 |
| 4,297,565 | A * | 10/1981 | Parr | H05B 3/84 |
| | | | | 219/532 |
| 4,396,011 | A * | 8/1983 | Mack | A61H 23/02 |
| | | | | 601/18 |
| 4,577,435 | A * | 3/1986 | Springer | A01G 9/24 |
| | | | | 47/2 |
| 4,967,057 | A * | 10/1990 | Bayless | H05B 3/36 |
| | | | | 392/435 |
| 5,197,595 | A * | 3/1993 | Coultas | H05B 3/36 |
| | | | | 219/535 |
| 5,371,340 | A * | 12/1994 | Stanfield | A01K 1/0158 |
| | | | | 219/217 |
| 5,451,747 | A * | 9/1995 | Sullivan | A61F 7/007 |
| | | | | 219/505 |
| 6,084,209 | A * | 7/2000 | Reusche | H05B 3/342 |
| | | | | 219/217 |
| 6,622,652 | B1 * | 9/2003 | Wang | A01K 1/0353 |
| | | | | 119/28.5 |
| 6,884,965 | B2 * | 4/2005 | Nelson | H05B 3/34 |
| | | | | 219/217 |
| 6,969,831 | B1 * | 11/2005 | Parker | H05B 3/342 |
| | | | | 219/528 |
| 7,202,444 | B2 * | 4/2007 | Bulgajewski | H05B 3/34 |
| | | | | 219/217 |
| 7,965,930 | B2 * | 6/2011 | Carlson | F16L 11/127 |
| | | | | 137/341 |
| 8,657,270 | B2 * | 2/2014 | Takada | F16F 9/38 |
| | | | | 267/221 |
| 8,707,904 | B2 * | 4/2014 | Ertel | A01K 1/0158 |
| | | | | 119/28.5 |
| 8,816,251 | B2 * | 8/2014 | Olsen | F24D 13/02 |
| | | | | 219/549 |
| 9,322,501 | B1 * | 4/2016 | Carlson | B29C 53/785 |
| D1,061,921 | S * | 2/2025 | Yang | D24/206 |
| 12,376,196 | B1 * | 7/2025 | Ye | H05B 3/36 |
| 2004/0040946 | A1 * | 3/2004 | Nation | H05B 3/34 |
| | | | | 219/217 |
| 2004/0065659 | A1 * | 4/2004 | Tse | H05B 3/145 |
| | | | | 219/549 |
| 2005/0034891 | A1 * | 2/2005 | Ekeberg | H01B 7/14 |
| | | | | 174/113 R |
| 2006/0113296 | A1 * | 6/2006 | Liang | H05B 3/36 |
| | | | | 219/528 |
| 2006/0241730 | A1 | 10/2006 | Huang | |
| 2009/0107984 | A1 * | 4/2009 | Kohn | A61F 7/007 |
| | | | | 219/528 |
| 2014/0037276 | A1 * | 2/2014 | Carlson | F16L 11/16 |
| | | | | 392/468 |
| 2016/0302262 | A1 * | 10/2016 | Hsu | H05B 3/04 |
| 2017/0311388 | A1 * | 10/2017 | Hsu | H05B 3/36 |
| 2022/0160540 | A1 * | 5/2022 | Wang | A61F 7/08 |
| 2024/0260140 | A1 * | 8/2024 | Wang | H05B 1/0272 |
| 2024/0365442 | A1 * | 10/2024 | Ye | H05B 3/148 |
| 2025/0213066 | A1 * | 7/2025 | Ye | A47J 36/2483 |

* cited by examiner

Turn on a power supply to enable the circuit to reach a first temperature — S21

FIG. 3

HEATING PAD AND SYSTEM

CROSS-REFERENCE TO RELATED APPLICATIONS

The application is based on and claims priority of Chinese patent application CN 202521385041.7, filed on Jul. 3, 2025, which is based on and claims part of priority to Chinese Patent Application No. 202520084257.3, filed on Jan. 14, 2025. The application is also based on and claims priority of Chinese patent application CN 202510058230.1, filed on Jan. 14, 2025; and also claims priority of International Application No. PCT/CN2025/107029 filed on Jul. 4, 2025; and also claims priority of International Application No. PCT/CN2025/074806 filed on Jan. 24, 2025. These applications are incorporated herein by reference in their entireties.

TECHNICAL FIELD

The application relates to the technical field of heating pads, in particular to a heating pad and system.

BACKGROUND

In daily life, in a case where food, clothes or other daily necessities are cold or humid, the food, clothes or other daily necessities often need to be heated or dried. For example, in a case where milk needs to be heated in cold winter, if the milk is poured into a pot to be heated independently, the operation is inconvenient. For another example, in a case where clothes become humid in a gloomy and cold weather, the clothes need to be dried. For yet another example, food will gradually cool down with time during a meal in cold seasons. Based on these application scenarios, a heating pad is developed to heat or dry the food, clothes or other daily necessities.

For example, Patent No. CN217744141U discloses a flexible food heating board, including an electric control device and a food heating board main body, wherein the food heating board main body is made from a flexible material and may be spread or rolled up be stored, an electric heating assembly is arranged in the food heating board body, and the electric heating assembly includes a heating device electrically connected to the electric control device.

Patent No. US20060241730A1 discloses a heat treating pad for a skin surface, and particularly relates to a low voltage and high performance climate control pad for the skin surface, wherein an air circulating circuit is formed on a pad body for a heat generating element disposing thereon so as to provide an even heat/cold treating surface on the pad body for applying on the skin surface.

However, it is found, by market research and actual use, that existing heating pads are complex in operation in actual use. Because the existing heating pads generally have multiple gears, customers cannot quickly switch the heating pads to a desired operating mode in actual use, leading to misoperation of multiple customers in actual use; and food, clothes or other daily necessities to be heated cannot be quickly heated, leading to the technical problems of unsatisfactory heating effect, poor user experience and poor safety performance.

SUMMARY

In view of the above mentioned technical problems, the application provides a heating pad, including an operation region and a heating region. The operation region includes an upper shell and a lower shell. The upper shell is a shell structure provided with a through-hole. The lower shell is arranged opposite to the upper shell, and the upper shell and the lower shell are fixedly connected to form a receiving space. The operation region further includes a circuit board and an operation interface. The circuit board is mounted in the receiving space. The operation interface is arranged at the through-hole of the upper shell and electrically connected to the circuit board.

The operation region is fixedly connected to the heating region. The heating region includes a pad body. The pad body is made from a flexible material and includes an upper surface and a lower surface, and the upper surface and the lower surface are arranged opposite to each other. The heating region includes a plurality of support pillars. The support pillars are arranged on the lower surface, extend out from the lower surface and have a height greater than a thickness of the pad body. The heating region includes a heating wire mounted on the lower surface. Gaps are formed between the plurality of support pillars, and the heating wire is arranged in the gaps. The operation interface sends an electric signal to the circuit board to control a temperature of the heating wire to reach a preset desired temperature.

The heating region further includes mounting grooves provided with openings. The mounting grooves are located in the gaps. Each mounting groove includes a bottom wall, a first side wall and a second side wall, wherein the second side wall is arranged opposite to the first side wall; the bottom wall, the first side wall and the second side wall are designed integrally, and a slot space is defined by the bottom wall, the first side wall and the second side wall; and the heating wire is arranged in the slot space. In an extension direction from the upper surface to the lower surface, a distance between the first side wall and the second side wall of the mounting groove decreases gradually.

In some embodiments of the application, the height of the support pillars is at least twice the thickness of the pad body.

BRIEF DESCRIPTION OF THE DRAWINGS

Drawings described here are used to provide a further understanding of the application and constitute part of the application. Schematic embodiments of the application and descriptions thereof are used for explaining the application and should not be construed as improper limitations of the application. Some specific embodiments of the application are described in detail below illustratively rather than reactively with reference to the drawings. Identical reference signs in the drawings indicate identical or similar components or parts. Those skilled in the art should understand that the drawings are not definitely drawn to scale. Wherein:

FIG. 3 is a flow diagram of Step S2 according to another embodiment of the application.

DESCRIPTION OF EMBODIMENTS

Figure 1:
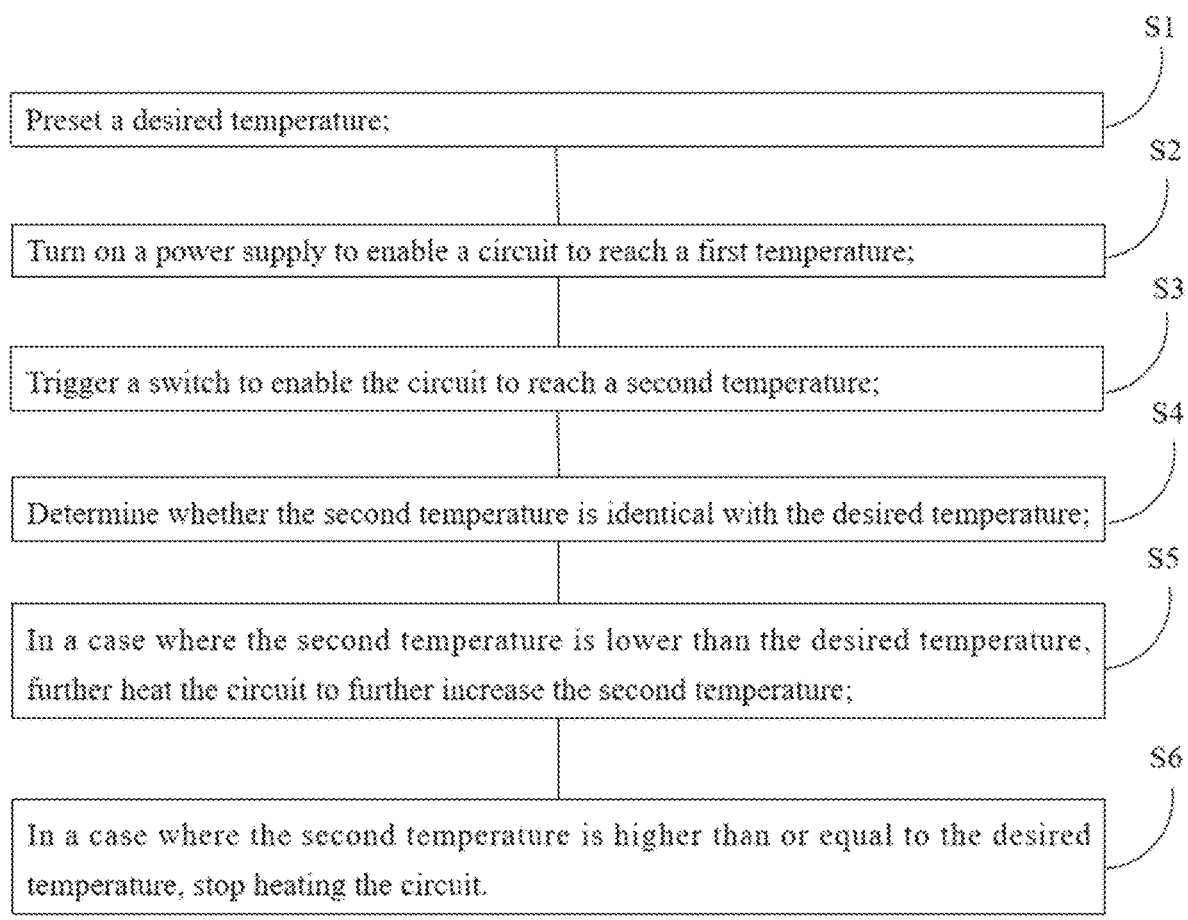
FIG. 1 is a schematic flow diagram of a heating method according to the application.

The technical solutions in the embodiments of the application are clearly and completely described below in conjunction with the drawings in the embodiments of the application. Obviously, the embodiments described below are merely illustrative ones, and are not all possible ones of the application. All other embodiments obtained by those ordinarily skilled in the art without creative labor should also fall within the protection scope of the application.

It should be noted that all directional indications (such as "upper", "lower", "left", "right", "front" and "back") in the embodiments of the application are merely used for explaining relative positional relations or motions between components (as shown below) at a specific attitude. If the attitude changes, the directional indications will change accordingly.

In addition, terms such as "first" and "second" involved in the application are merely used for the purpose of description and should not be construed as indicating or implying relative importance or implicitly indicating the number of technical features referred to. Thus, a feature defined by "first" or "second" may explicitly or implicitly indicate the inclusion of at least one said feature. In the description of the application, "multiple" means at least two, such as two or three, unless otherwise expressly and specifically defined.

In the application, unless otherwise expressly stated and defined, terms such as "connect" and "fix" should be understood in a broad sense. For example, "connect" may refer to fixed connection, detachable connection or integrated connection; mechanical connection or electrical connection; direct connection, indirect connection by means of an intermediate medium, internal communication or interaction of two elements. Those ordinarily skilled in the art may appreciate the specific meanings of these terms in the application according to specific circumstances.

The drawings in the application are merely used for explanation. Sizes and shapes involved in the drawings are merely representations of embodiments and should not be construed as limitations of the protection scope of the claims.

In addition, the technical solutions in the embodiments of the application may be combined as long as the combinations may be implemented by those ordinarily skilled in the art. Any combination of the technical solutions that lead to a contradiction or cannot be implemented should be considered as non-existent and should not fall within the protection scope of the application.

As shown in FIG. 1 which is a schematic flow diagram of a heating method according to the application, the heating method includes the following steps:

S1, presetting a desired temperature;

S2, turning on a power supply to enable a circuit to reach a first temperature;

S3, triggering a switch to enable the circuit to reach a second temperature;

S4, determining whether the second temperature is identical with the desired temperature; and S5, in a case where the second temperature is lower than the desired temperature, further heating the circuit to further increase the second temperature; or S6, in a case where the second temperature is higher than or equal to the desired temperature, stopping heating the circuit;

wherein, the first temperature is lower than the second temperature.

It should be noted that in the application, unless otherwise specially stated, indications such as S1, S2 and S3 are merely for a better understanding of the relations between steps of methods and for the convenience of marking in the drawings and are not intended to define a unique precedence relationship between the steps.

It should be noted that the value of the desired temperature may be preset as actually needed before delivery and will not be enumerated here. The specific value of the desired temperature will not be limited in the application.

In one embodiment of the application, by turning on the power supply to enable the circuit to reach the first temperature in Step S2, the circuit is heated to a temperature, that is lower than the second temperature, before being further heated to the second temperature.

For example, in a case where an operator needs to heat milk, first, the milk is heated to a temperature of 30° C. On one hand, this temperature informs the operator that a device has started to work and further heating may be started; and on the other hand, an article to be heated is preheated to prevent a danger (such as an explosion, food spoilage and burning-down) in the rapid heating process. For example, in cold winter, the room temperature may be 0° C., the first temperature is set to 40° C., and the second temperature is set to 100° C.

In another embodiment of the application, the first temperature may be a temperature in a standby state after the power supply is turned on. The value of the first temperature is not specifically set. The first temperature may be the room temperature or a preheat temperature obtained after preheating.

It should be noted that in a preferred embodiment of the application, a difference between the first temperature and the second temperature is greater than or equal to 40° C.

For example, in a case where the first temperature is 40° C., the second temperature is greater than or equal to 80° C. In a case where the first temperature is 50° C., the second temperature is greater than or equal to 90° C.

In the application, by setting the second temperature and the desired temperature, the heating process of the whole circuit is simpler and more intelligent; and in the heating process, customers do not need to adjust different operating modes or different gears, and the circuit reaches the desired operating temperature directly by "one-button heating" (i.e., by triggering the switch), and then the desired operating temperature is kept constant. In this way, no more operation is needed, and misoperation is unlikely to occur.

Figure 2:
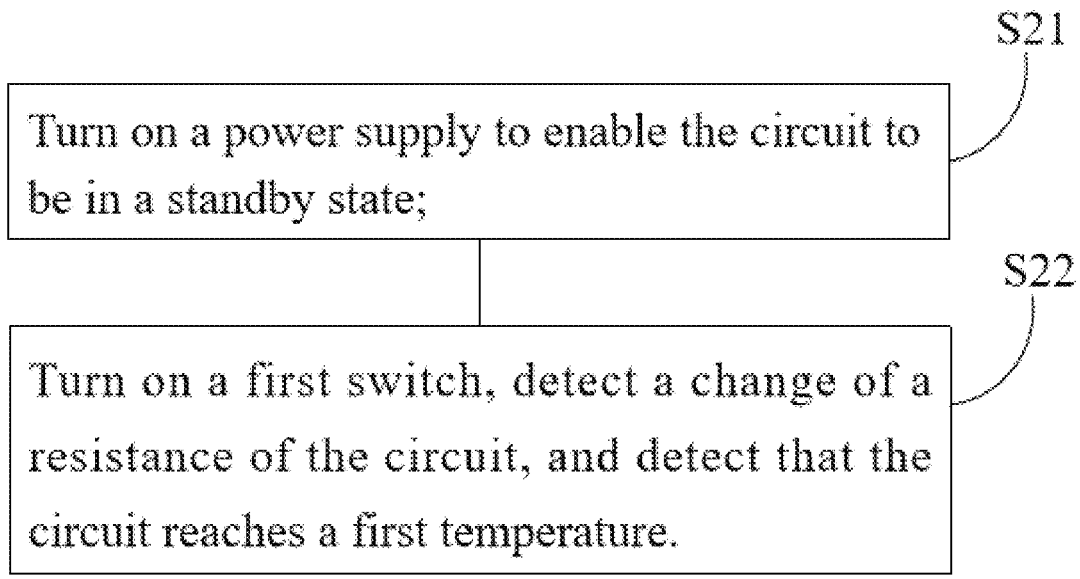
FIG. 2 is a flow diagram of Step S2 according to one embodiment of the application.

As shown in FIG. 2 which is a flow diagram of Step S2 according to one embodiment of the application, Step S2 includes:

S21, turning on the power supply to enable the circuit to be in a standby state; and S22, turning on a first switch, detecting a change of a resistance of the circuit, and detecting that the circuit reaches the first temperature.

In this case, Step S2 includes two steps. In the first step, the circuit is in the standby state and is not heated, and the temperature in the standby state is equal to the room temperature. In the second step, the first switch is triggered to start to the heat the whole circuit, and the heating temperature is not high and is a low temperature and kept constant.

"Low temperature" mentioned here is with respect to the second temperature, and any temperature lower than the second temperature may be referred to as a low temperature.

As shown in FIG. 3 which is a flow diagram of Step S2 according to another embodiment of the application, Step S2 includes:

S021, turning on the power supply to enable to the circuit to reach the first temperature.

In this embodiment, after the power supply is turned on, heating is started to enable the temperature of the circuit to reach the first temperature.

Figure 4:
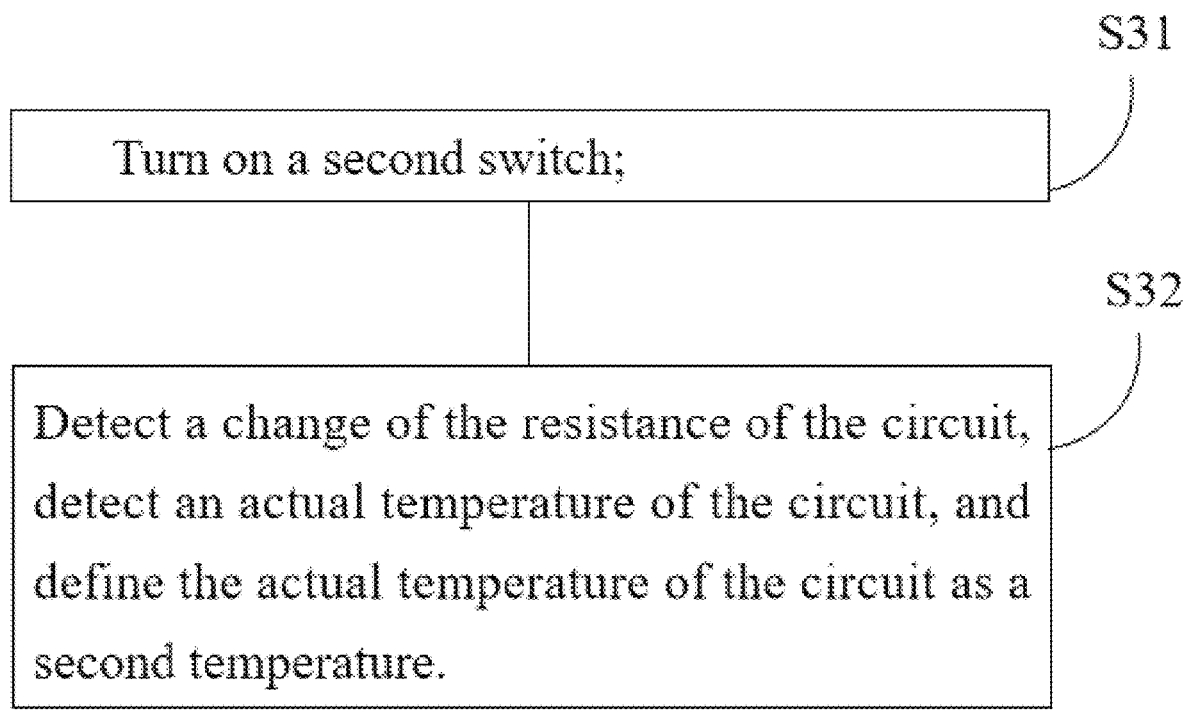
FIG. 4 is a schematic flow diagram of Step S3.

As shown in FIG. 4 which is a schematic flow diagram of Step S3, Step S3 includes:

S31, turning on a second switch; and

S32, detecting a change of the resistance of the circuit, detecting an actual temperature of the circuit, and defining the actual temperature of the circuit as the second temperature.

Figure 5:
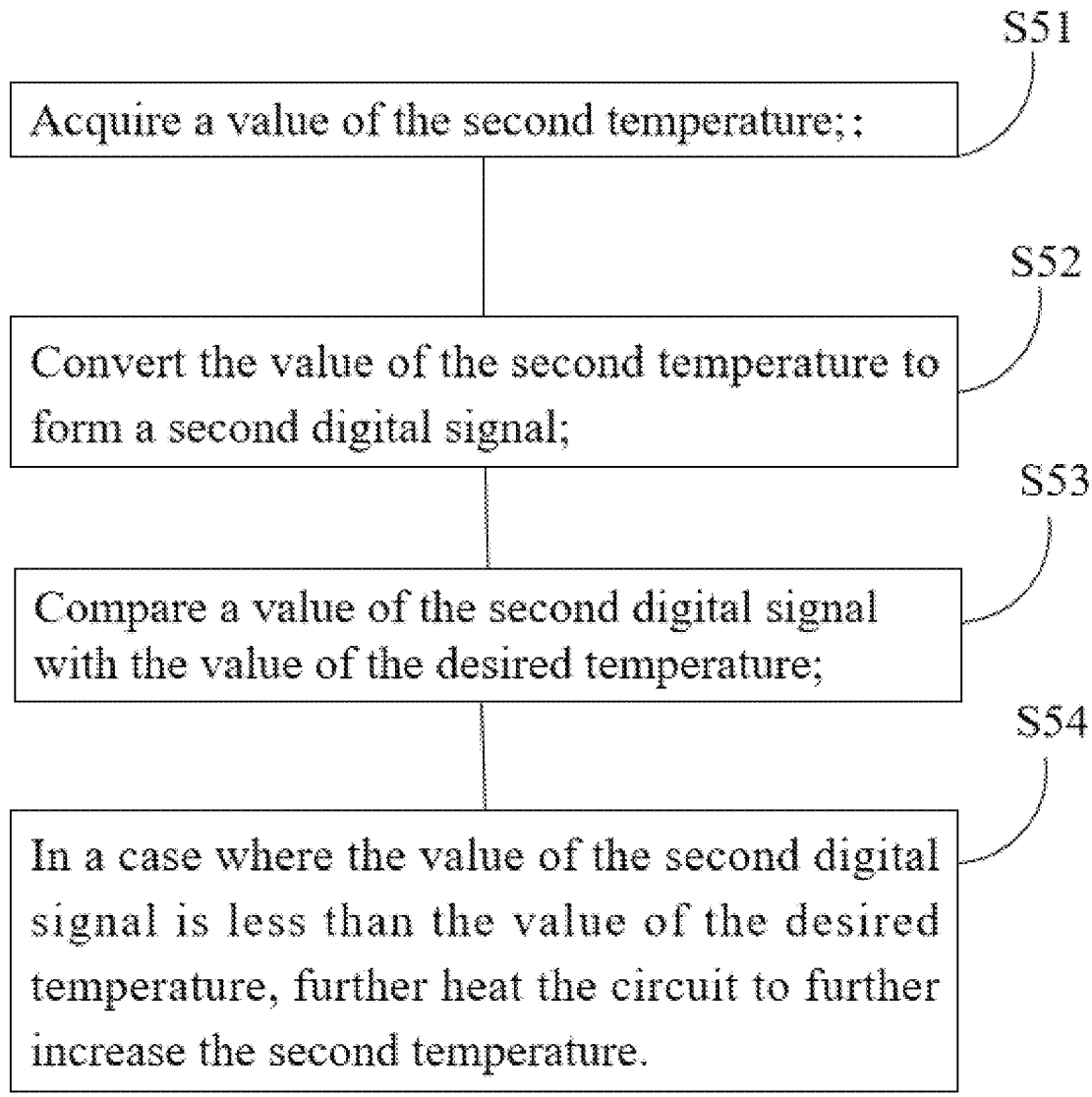
FIG. 5 is a schematic flow diagram of Step S5.

As shown in FIG. 5 which is a schematic flow diagram of Step S5, Step S5 includes:

S51, acquiring a value of the second temperature;

S52, converting the value of the second temperature to form a second digital signal;

S53, comparing a value of the second digital signal with the value of the desired temperature; and S4, in a case where the value of the second digital signal is less than the value of the desired temperature, further heating the circuit to further increase the second temperature.

Figure 6:
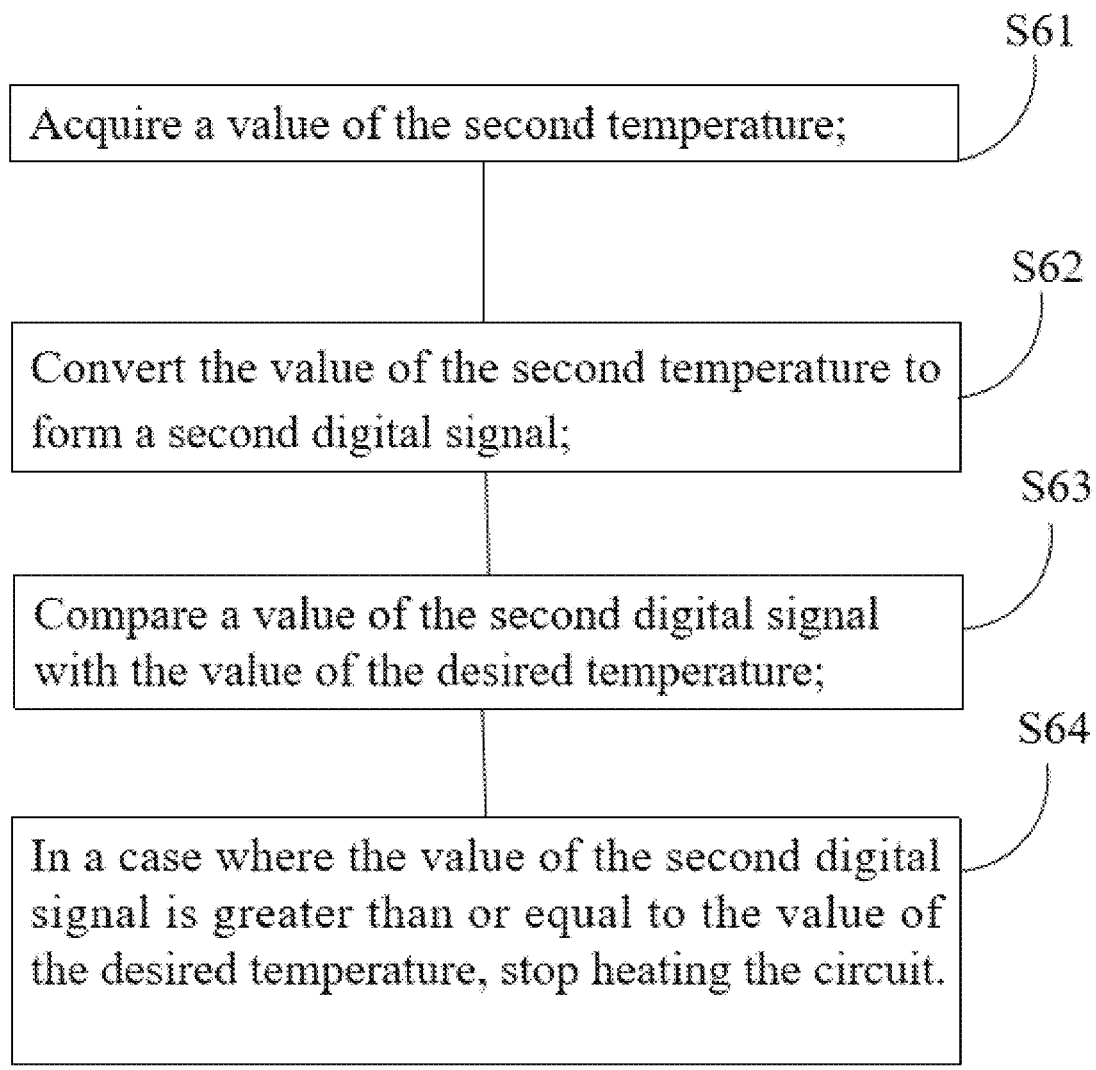
FIG. 6 is a schematic flow diagram of Step S6.

As shown in FIG. 6 which is a schematic flow diagram of Step S6, Step S6 includes:

S61, acquiring a value of the second temperature;

S62, converting the value of the second temperature to form a second digital signal;

S63, comparing a value of the second digital signal with the value of the desired temperature; and S64, in a case where the value of the second digital signal is greater than or equal to the value of the desired temperature, stopping heating the circuit.

Figure 7:
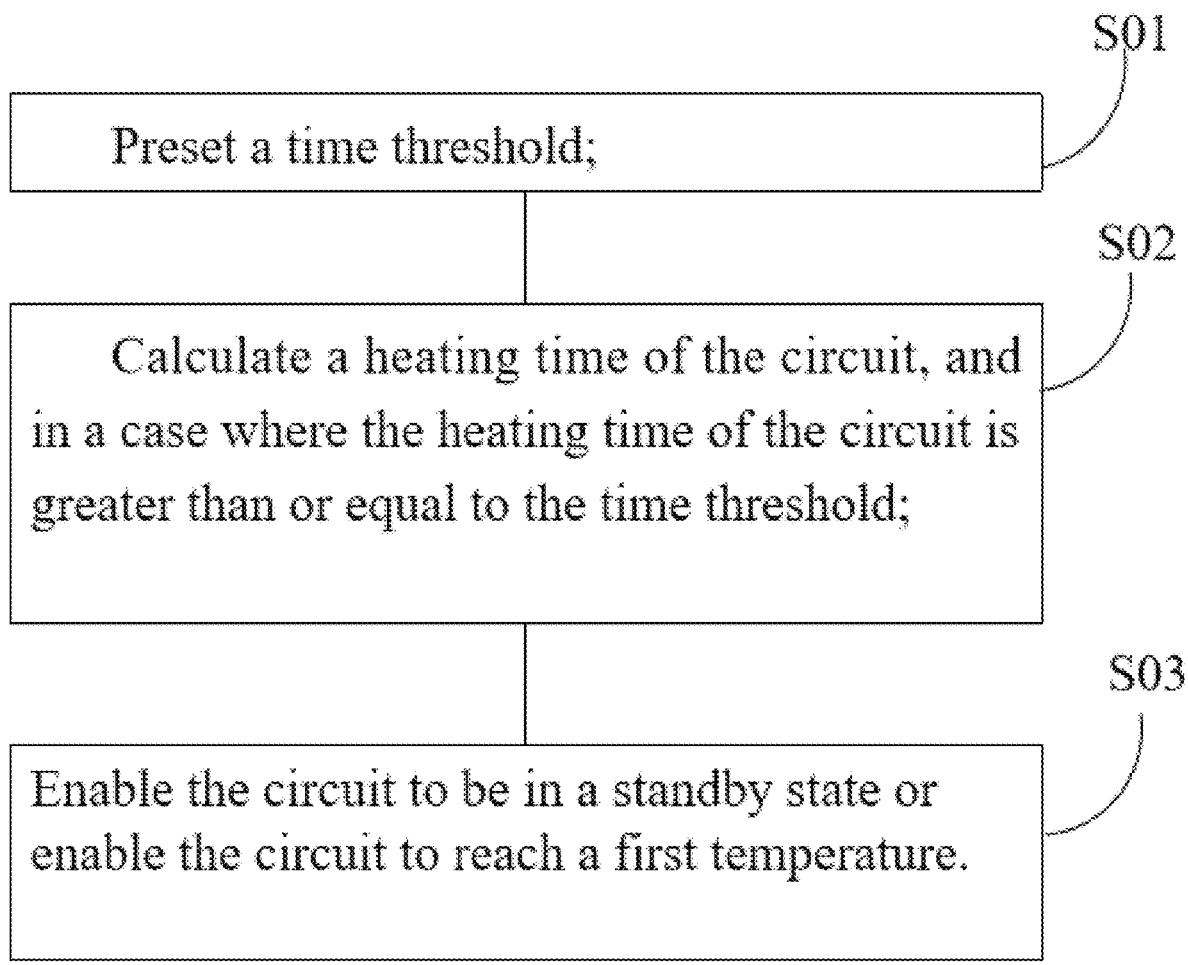
FIG. 7 is a schematic flow diagram of the heating method.

As shown in FIG. 7 which is a schematic flow diagram of the heating method, the heating method further includes the following steps:

S01, presetting a time threshold;

S02: calculating a heating time of the circuit, and in a case where the heating time of the circuit is greater than or equal to the time threshold;

S03, enabling the circuit to be in the standby state or enabling the circuit to reach the first temperature.

It should be noted that by performing the above steps, whether the circuit needs to be switched to the standby state or needs to reach the first temperature is determined by recognizing a change of time, to realize the technical effects of energy saving and environmental friendliness of the circuit. In a case where the circuit is not used for a long time, the circuit may be switched to the standby state or reach the first temperature to reduce the loss of electric energy.

It should be noted that the second temperature mentioned in the application may be a value that changes in real time in some embodiments.

Figure 8:
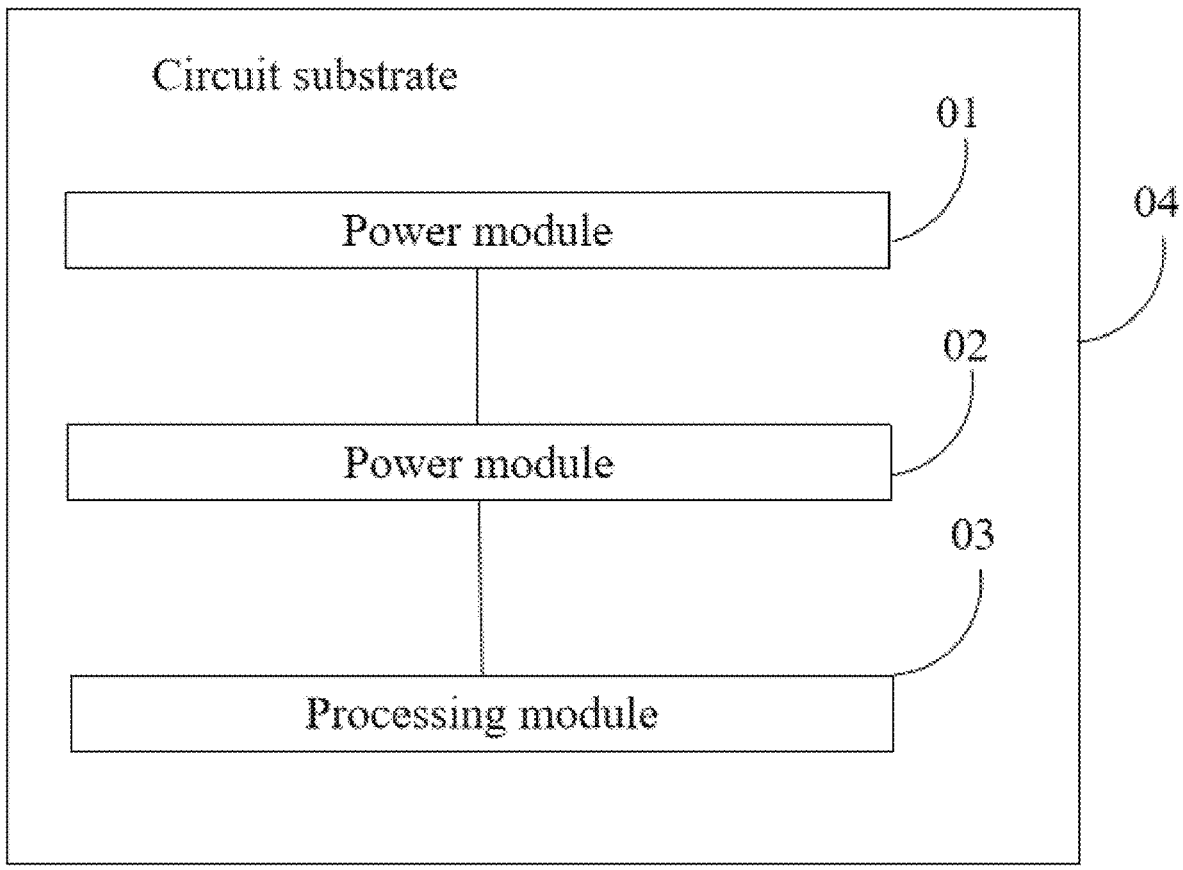
FIG. 8 is a schematic structural diagram of a heating circuit.

As shown in FIG. 8 which is a schematic structural diagram of a heating circuit, the heating circuit includes:

a power module 01, connected to an external power supply to enable a circuit to reach a first temperature and configured to trigger a switch to enable the circuit to reach a second temperature;

a heating module 02, electrically connected to the power module 01, wherein the power module 01 supplies power to the heating module 02 to change a temperature of the heating module 02;

a processing module 03, configured to preset a desired temperature, determine whether the second temperature is identical with the desired temperature, enable the circuit to be further heated to further increase the second temperature in a case where the second temperature is lower than the desired temperature, and stop heating the circuit in a case where the second temperature is higher than or equal to the desired temperature;

wherein, the first temperature is lower than the second temperature; and a circuit board 04, wherein the power module 01 and the processing module 03 are mounted on the circuit board 04, and the power module 01, the processing module 03 and the heating module 02 are electrically connected.

It should be noted that in another embodiment of the application, the application further provides a circuit board, including:

a power module, configured to trigger a switch to enable the circuit to reach the second temperature;

a processing module, configured to preset the desired temperature, determine whether the second temperature is identical with the desired temperature, enable the circuit to be further heated to further increase the second temperature in a case where the second temperature is lower than the desired temperature, and stop heating a heating wire in a case where the second temperature is higher than or equal to the desired temperature; and a circuit substrate, wherein the power module and the processing module are mounted on the circuit substrate, and the power module and the processing module are electrically connected.

The heating wire is electrically connected to the power module, and the power module supplies power to the heating wire to change the temperature of the heating wire.

It should be noted that the power module mentioned here may be a power switch and may be connected to an external power supply to supply power to the heating wire. The external power supply may be connected to a mains supply or a power supply provided by a battery. The heating module is a heating wire, and the processing module may control heating parameters (such as on/off, heating time and heating temperature) of the heating wire. The processing module may be a combination for realizing a calculation function, such as a combination of one or more microprocessors, a combination of digital signal processing (DPS) and a microprocessor, or a broader concept including a processor and a memory, which will not be enumerated here.

It should be noted that the circuit substrate may be at least one selected from a ceramic circuit substrate, an aluminum oxide ceramic circuit substrate, an aluminum nitride ceramic circuit substrate, a circuit board, a printed circuit substrate (PCB), an aluminum substrate, a high-frequency substrate, a thick copper substrate, an impedance substrate, an ultrathin circuit substrate and a printed (copper-etched) circuit substrate.

Figure 9:
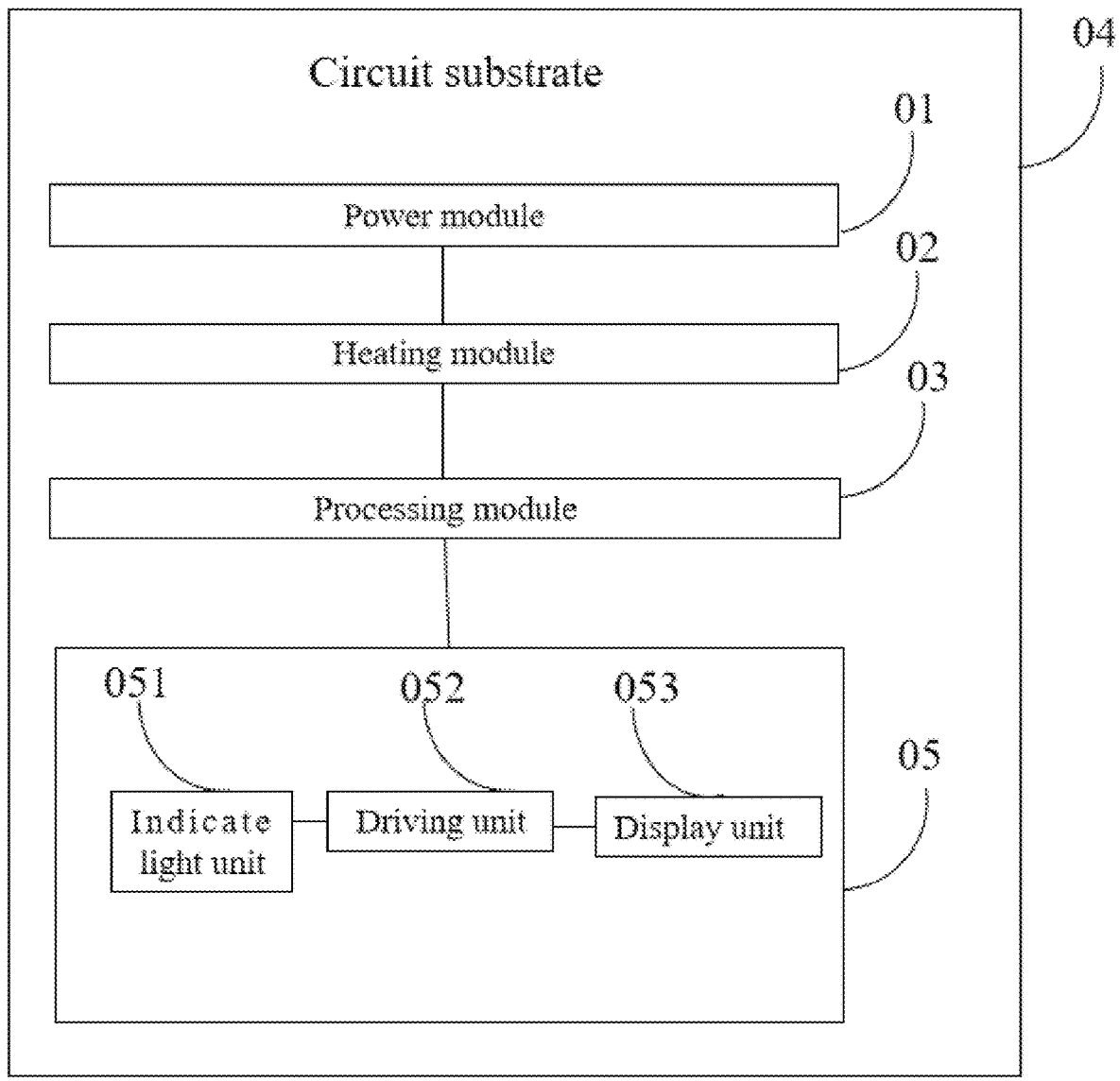
FIG. 9 is a schematic structural diagram of another heating circuit according to the application.

As shown in FIG. 9 which is a schematic structural diagram of another heating circuit according to the application, the heating circuit includes:

a power module 01, connected to an external power supply to enable a circuit to reach a first temperature and configured to trigger a switch to enable the circuit to reach a second temperature;

a heating module 02, electrically connected to the power module 01 wherein the power module 01 supplies power to the heating module 02 to change a temperature of the heating module 02;

a processing module 03, configured to preset a desired temperature, determine whether the second temperature is identical with the desired temperature, enable the circuit to be further heated to further increase the second temperature in a case where the second temperature is lower than the desired temperature, and stop heating the circuit in a case where the second temperature is higher than or equal to the desired temperature;

wherein, the first temperature is lower than the second temperature;

a circuit substrate 04, wherein the power module 01 and the processing module 03 are mounted on the circuit substrate 04, and the power module 01, the processing module 03 and the heating module 02 are electrically connected; and a display module 05, electrically connected to the power module 01 and the processing module 03 and including:

an indicator light unit 051;

a driving unit 052, configured to drive the indicator light unit 051; and a display unit 053, wherein the indicator light unit 051 and the display unit 053 are electrically connected;

wherein, the indicator light unit 051, the driving unit 052 and the display unit 053 are electrically connected.

It should be noted that in one embodiment of the application, the processing module determines whether the second temperature is identical with the desired temperature based on the following basic principle:

In this embodiment, a thermosensitive resistor, such as Negative Temperature Coefficient (NTC), which is a thermistor phenomenon and material, the resistance of which decreases exponentially with the increase in temperature and has a negative temperature coefficient. In this embodiment, a microcontroller unit (MCU) is arranged as a specific embodiment of the processing module 03.

It should be noted that the use of the NTC or the MUC does not exclude other electronic components with a similar function, particularly electronic components such as temperature sensors.

Further, the resistance of the NTC changes with the change of the temperature of a heating wire in the heating module, the change of the resistance of the NTC will lead to a change of the voltage of a detection pin of the MCU, and then, the voltage signal is converted into a digital signal by means of a module conversion circuit, such that the digital signal of the second temperature is formed.

Then, in the process of presetting the desired temperature, the digital signal of the preset desired temperature has been formed.

Finally, the value of the digital signal of the second temperature and the value of the digital signal of the desired temperature are compared to make a determination.

It should be noted that the display module may realize at least one of acoustic display, optical display, visual display and display in other dimensions. For example, the indicator light unit 051 may be at least one of a light-emitting diode (LED), a fluorescent lamp and a halogen lamp. In this embodiment, an LED lamp is adopted preferably. The display unit 053 may be at least one of an LED display screen, an LCD display screen and an LOD display screen. The display module 05 is used for displaying parameters of a heating pad, such as at least one of the on-off state, the heating time and the heating temperature.

Figure 10:
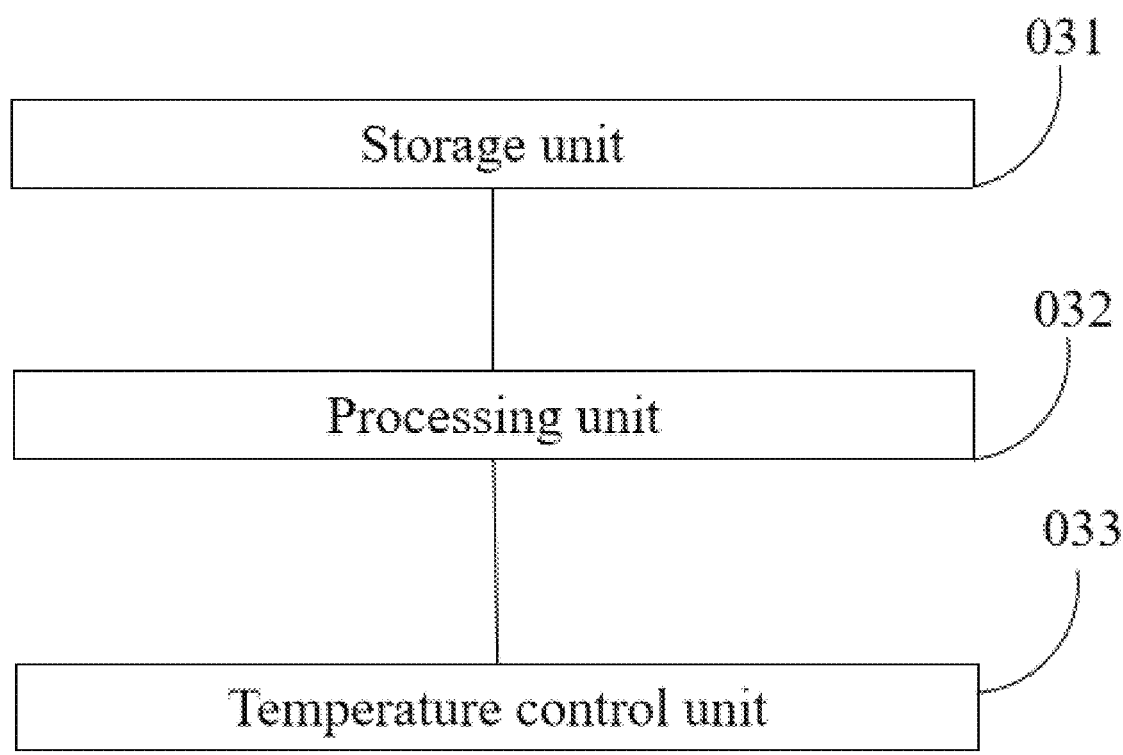
FIG. 10 is a schematic structural diagram of a processing module according to the application.

As shown in FIG. 10 which is a schematic structural diagram of the processing module according to the application, the processing module includes:

a storage unit 031, configured to store the desired temperature;

a processing unit 032, configured to determine whether the second temperature is identical with the desired temperature, enable the circuit to be further heated to further increase the second temperature in a case where the second temperature is lower than the desired temperature, and stop heating the circuit in a case where the second temperature is higher than or equal to the desired temperature; and a temperature control unit 033, electrically connected to the processing unit 032 and configured to receive the value of the first temperature and the value of the second temperature.

Figure 11:
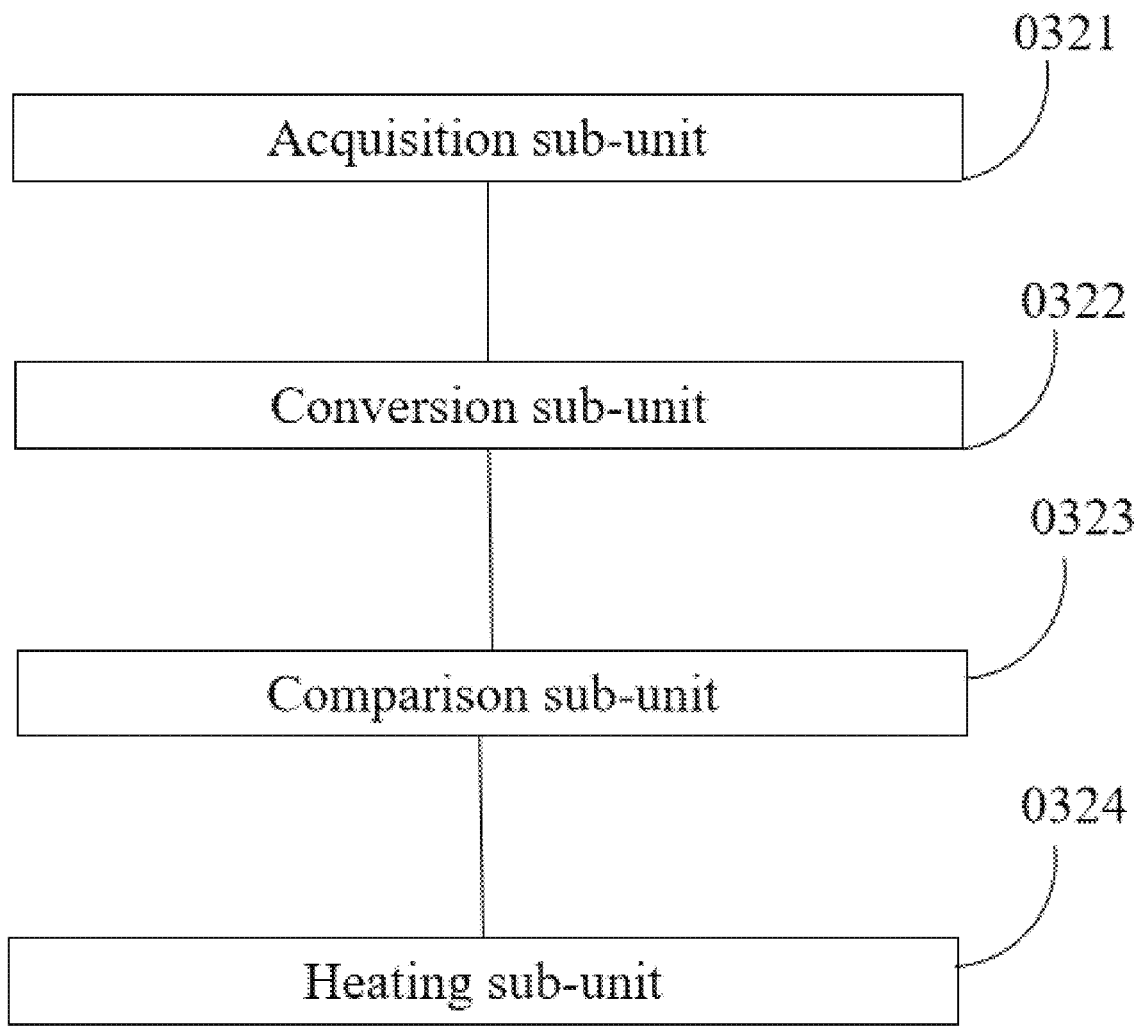
FIG. 11 is a schematic structural diagram of a processing unit 032 according to the application.

As shown in FIG. 11 which is a schematic structural diagram of the processing unit 032 according to the application, the processing unit 032 includes:
- an acquisition sub-unit 0321, configured to acquire the value of the second temperature;
- a conversion sub-unit 0322, configured to convert the value of the second temperature to form the second digital signal;
- a comparison sub-unit 0323, configured to compare the value of the second digital signal with the value of the desired temperature; and
- a heating sub-unit 0324, configured to further heat the circuit to further increase the second temperature in a case where the value of the second digital signal is less than the value of the desired temperature.

Figure 12:
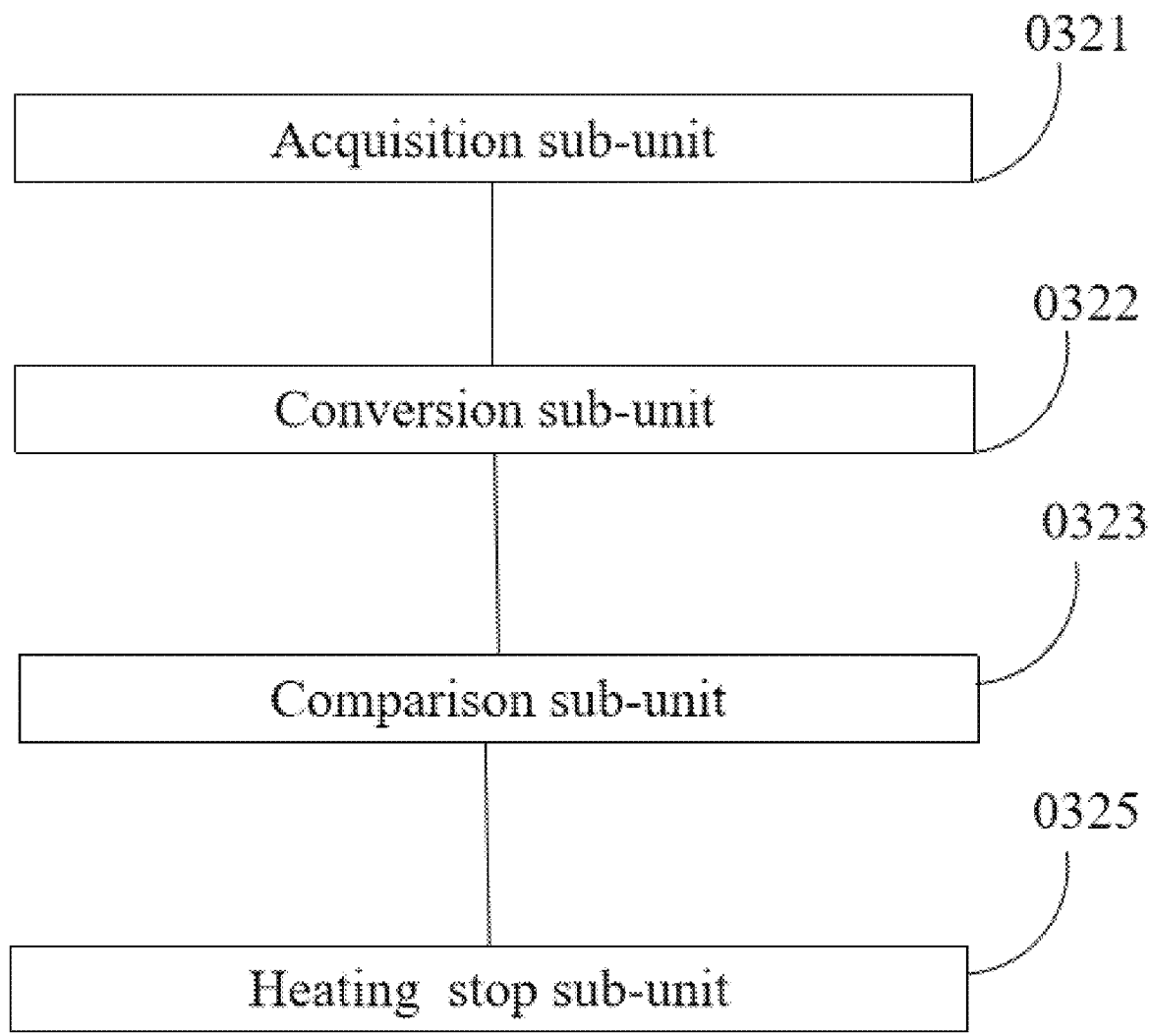
FIG. 12 is a schematic structural diagram of the processing unit 032 according to the application.

As shown in FIG. 12 which is a schematic structural diagram of the processing unit 032 according to the application, the processing unit 032 includes:
- an acquisition sub-unit 0321, configured to acquire the value of the second temperature;
- a conversion sub-unit 0322, configured to convert the value of the second temperature to form the second digital signal;
- a comparison sub-unit 0323, configured to compare the value of the second digital signal with the value of the desired temperature; and
- heating stop sub-unit 0325, configured to stop heating the circuit in a case where the value of the second digital signal is greater than or equal to the value of the desired temperature.

Figure 13:
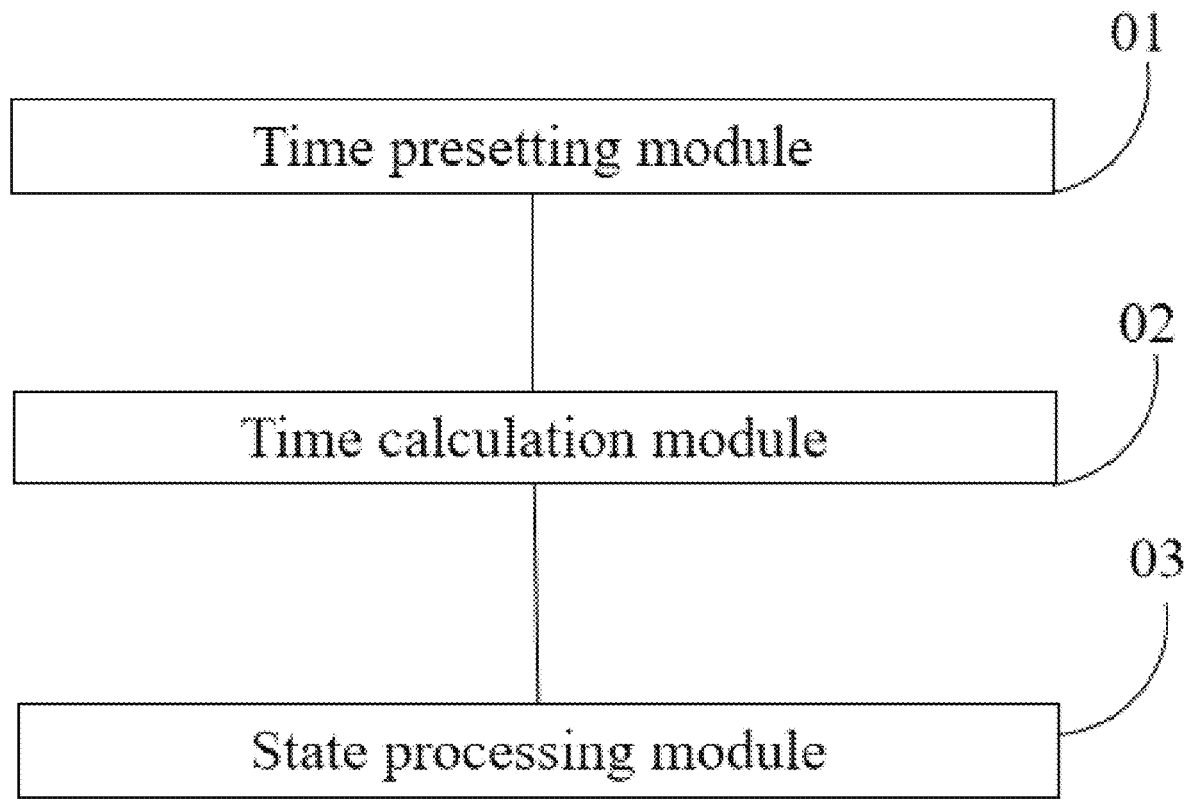
FIG. 13 is a schematic structural diagram of a heating circuit according to another embodiment of the application.

As shown in FIG. 13 which is a schematic structural diagram of a heating circuit according to another embodiment of the application, the heating circuit includes:
- a time presetting module 01, configured to preset a time threshold;
- a time calculation module 02, configured to calculate a heating time of the circuit; and
- a state processing module 03, configured to enable the circuit to be in a standby state or reach a first temperature in a case where the heating time of the circuit is greater than or equal to the time threshold.

It should be noted that by performing the above steps, whether the circuit needs to be switched to the standby state or needs to reach the first temperature is determined by recognizing a change of time, to realize the technical effects of energy saving and environmental friendliness of the circuit. In a case where the circuit is not used for a long time, the circuit may be switched to the standby state or reach the first temperature to reduce the loss of electric energy.

Figure 14:
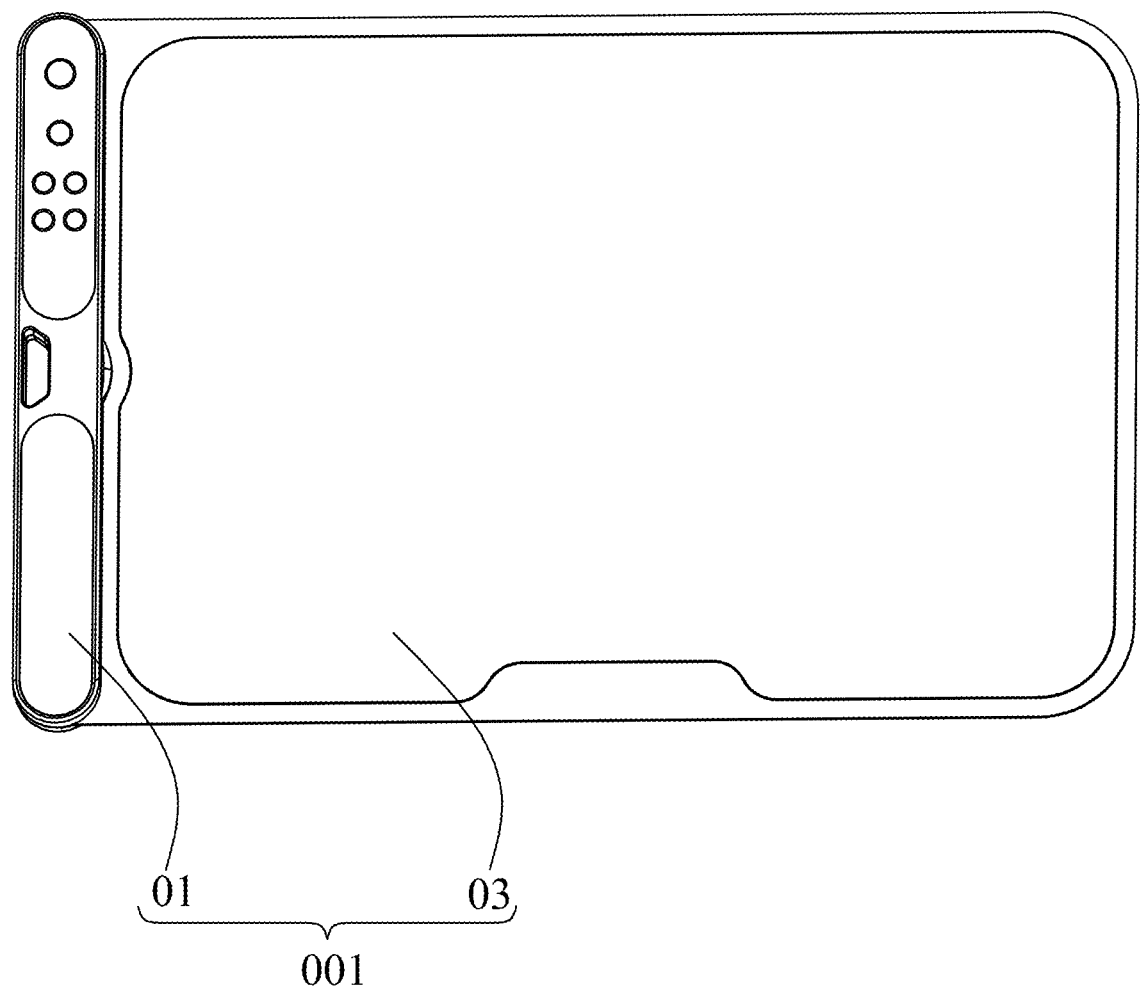
FIG. 14 is a structural diagram of a front side of a heating pad 001 according to the application.
Figure 15:
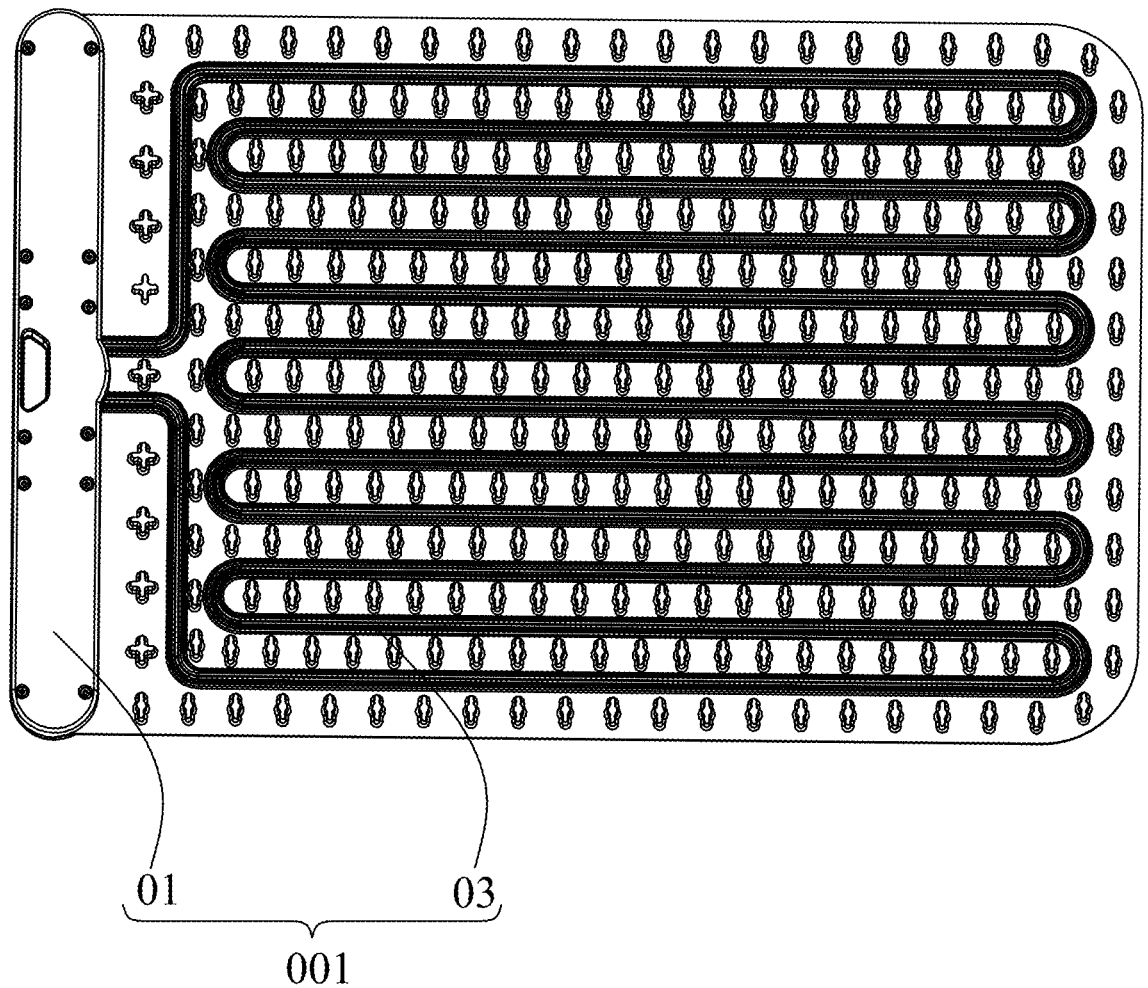
FIG. 15 is a schematic structural diagram of a back side of the heating pad 001 according to the application.
Figure 16:
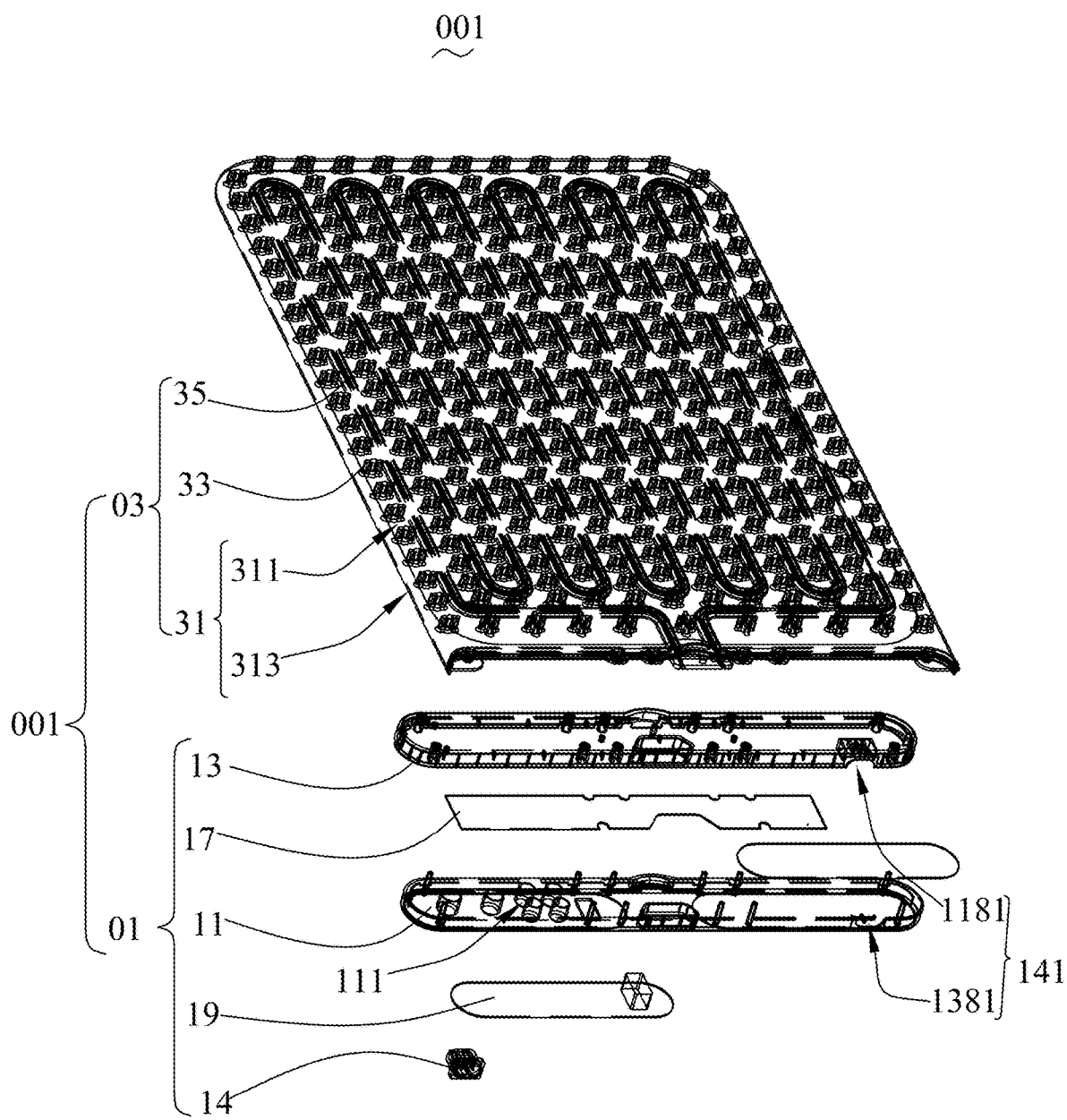
FIG. 16 is an exploded structural view of the heating pad 001 according to the application.

Refer to FIGS. 14, 15 and 16, wherein FIG. 14 is a structural diagram of a front side of a heating pad 001 according to the application, FIG. 15 is a schematic structural diagram of a back side of the heating pad 001 according to the application, and FIG. 16 is an exploded structural view of the heating pad 001 according to the application.

The heating pad 001 adopts any one of the heating methods described above. All heating methods and/or heating circuits involved in the application may be applied to the heating pad 001 and will not be repeated here. The heating pad 001 includes an operation region 01 and a heating region 03, and the operation region 01 and the heating region 03 are fixedly connected. The fixed connection between the operation region 01 and the heating region 03 may be screw connection, riveting, interference fit, clamping, gluing, or the like. In the application, the operation region 01 and the heating region 03 are detachably connected by screw connection.

The heating region 03 includes a pad body 31, which is made from a flexible material. The pad body 31 includes an upper surface 313 and a lower surface 311, and the upper surface 313 and the lower surface 311 are arranged opposite to each other. The upper surface 313 is an approximately flat smooth surface and allows an article to be heated to be placed thereon. In an actual application scenario, the article to be heated may be food, clothes, milk, meat to be unfrozen, or the like.

In the application, the flexible material of the pad body 31 may be silicone, rubber or other windable materials, which will not be enumerated here. In the application, silicone is adopted preferably.

The heating region 03 further includes a plurality of support pillars 33, which are arranged on the lower surface 311 and extend out from the lower surface 311. The height of the support pillars 33 is greater than the thickness of the pad body 31. Wherein, the support pillars 33 and the pad body 31 are designed integrally. In the actual production and machining process, the support pillars 33 and the pad body 31 are formed synchronously in a mold. It should be noted that the thickness of the pad body 31 is a minimum distance between the upper surface 313 and the lower surface 311, and the height of the support pillars 33 is a distance between top ends of the support pillars 33 and the lower surface 311.

It should be noted that the support pillars 33 are arranged in an array on the lower surface 311, gaps are formed between different support pillars 33, and the cross-section of the support pillars 33 may be triangular, quadrangular, pentagonal, hexagonal, heptagonal, octagonal, circular, oval or in other various irregular shapes.

In actual use, free ends of the support pillars 33 are generally in contact with the surface of a table, that is, the pad body 31 is placed on the surface of the table, and then the article to be heated is placed on the upper surface 313.

In a preferred embodiment of the application, the height of the support pillars 33 is at least twice the thickness of the pad body 31.

The heating region 03 further includes a heating wire 35, which is mounted on the lower surface 311. The heating wire 35 is arranged in the gaps formed between the plurality of support pillars 33 and wound around the support pillars 33 to form an approximate S shape. The heating wire 35 is also made from a flexible material.

It should be noted that in an application scenario of the application, the article to be heated is placed on the upper surface 313, and the lower surface 311 is generally placed on the surface of a table; and because the heating wire 35 is close to the lower surface 311, heat of the heating wire 35 is finally transferred to the article to be heated by heat conduction of the pad body 31. If the lower surface 311 close to the heating wire 35 is too close to the surface of the table, the surface of the table will be damaged by an excessively high temperature, and even a fire will be caused. Thus, in the application, the support pillars 33 are arranged, the height of the support pillars 33 is greater than the thickness of the pad body 31, and even in an optimal embodiment, the height of the support pillars 33 is at least twice the thickness of the pad body 31.

When customers place the heating pad 001 on the surface of a table, which is generally made from wood or coated with paint, if the heating pad 001 is not provided with the support pillars 33, the lower surface 311 of the heating pad 001 will be in direct contact with the surface of the table, and in this case, the wood or paint will be burnt out due to an excessively high temperature, resulting in potential safety hazards.

By arranging the support pillars 33, the lower surface 311 is isolated from the surface of the table by the support pillars 33; and the support pillars 33 are arranged in an array and spaced apart from each other to facilitate air circulation and heat dissipation, such that the potential safety hazard that the surface of the table may be burnt out is solved.

In some embodiments of the application, the height of the support pillars 33 is twice, three times, four times, five times or other times the thickness of the pad body 31, and is generally not over twenty times the thickness of the pad body 31.

Figure 17:
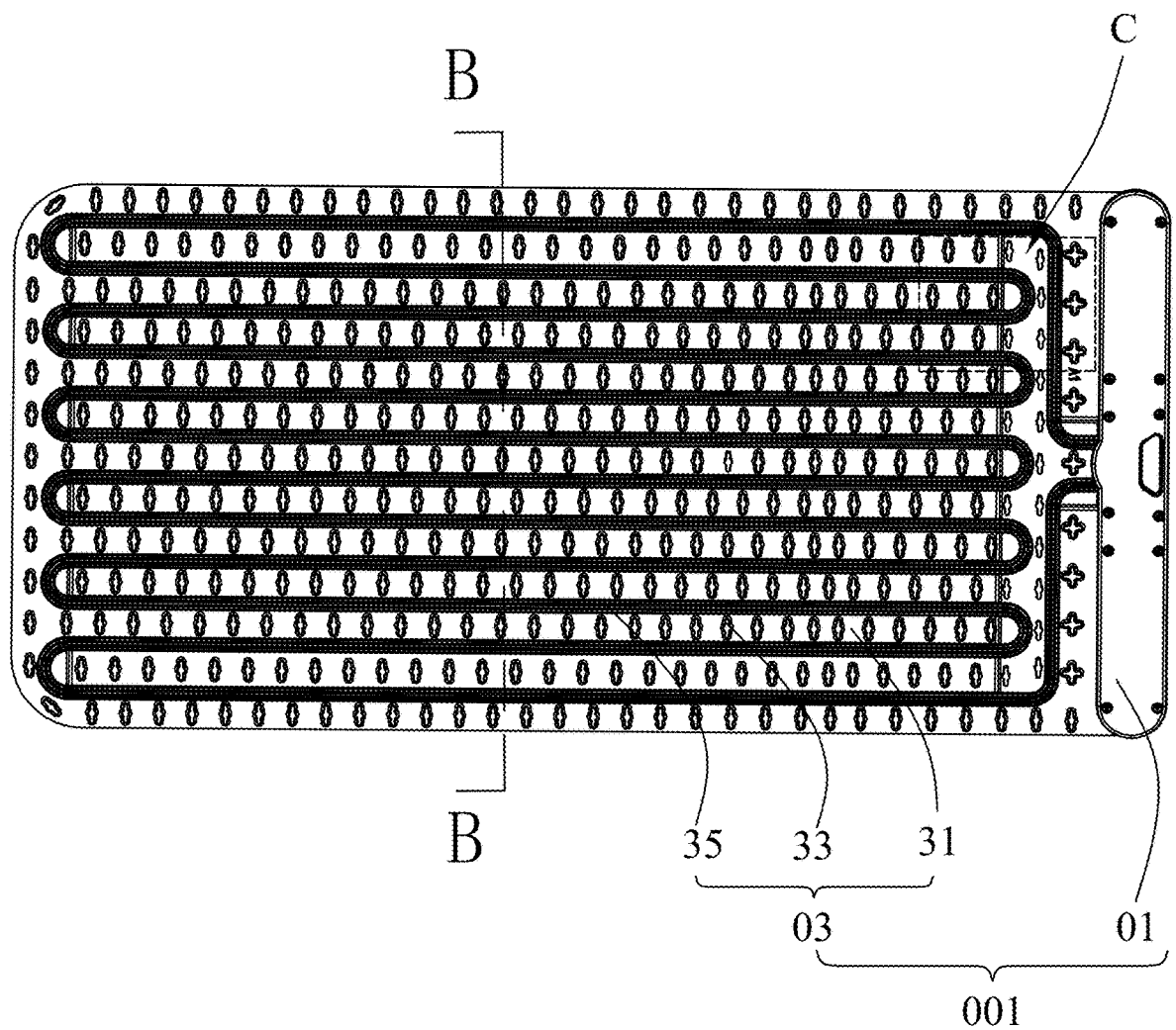
FIG. 17 is a schematic structural diagram of the heating pad 001 from a back view according to the application.
Figure 18:
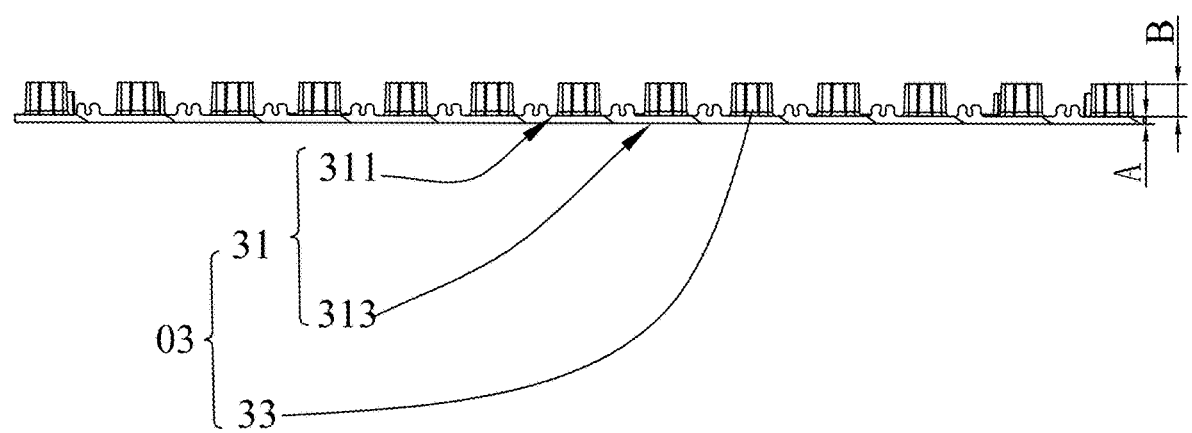
FIG. 18 is a partial sectional view of a heating region 03 along B-B in FIG. 17.

Refer to FIGS. 17 and 18, wherein FIG. 17 is a schematic structural diagram of the heating pad 001 from a back view according to the application, and FIG. 18 is a partial sectional view of the heating region 03 along B-B in FIG. 17 according to the application. In a preferred embodiment of the application, the height of the support pillars 33 is about five times the thickness of the pad body 31. In FIG. 17, A denotes the thickness of the pad body 31, and B denotes the height of the support pillars 33.

Figure 19:
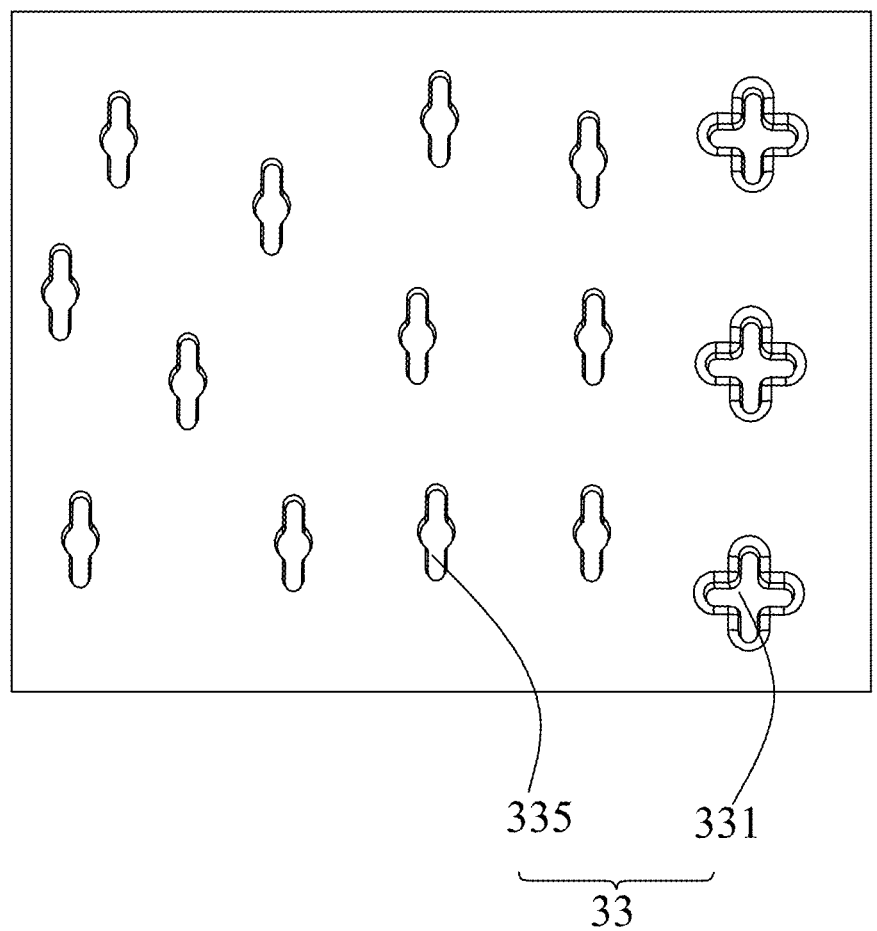
FIG. 19 is a schematic partial view of a region C of the heating pad 001 in FIG. 17.

Refer to FIG. 19 which is a schematic partial view of a region C of the heating pad 001 in FIG. 17. In the application, the support pillars 33 may be divided into proximal support pillars 331 and distant support pillars 335 according to cross-sectional areas and different positions of the support pillars 33. Wherein, the proximal support pillars 331 and the distant support pillars 335 are arranged on the lower surface 311 and extend out from the lower surface 311, wherein the proximal support pillars 331 are close to the operation region 01, and the distant support pillars 335 are away from the operation region 01. In the application, the support pillars 33 and the pad body 31 may be integrally formed or fixedly connected by gluing, snap fit, clamping, riveting or the like. In the application, the support pillars 331 and the pad body 31 are formed integrally.

The cross-sectional area of the proximal support pillars 331 is greater than the cross-sectional area of the distant support pillars 335, and the height of the proximal support pillars 331 is approximately the same as the height of the distant support pillars 335. In the application, because the operation region 01 is made from a rigid material while the heating region 03 is made from a flexible material, to prevent a subsiding region between the rigid material and the flexible material in transition from the rigid material to the flexible material, the cross-sectional area of the proximal support pillars 331 arranged in the vicinity of the operation region 01 (the rigid material) is larger to ensure that the proximal support pillars 331 are stable and have a better force-bearing capacity to fulfill a better support effect to prevent a collapse between the operation region 01 and the heating region 03. The cross-sectional area of the distant support pillars 335 away from the operation region 01 is smaller. In the application, the proximal support pillars 331 and the distant support pillars 335 have approximately the same height and are used for supporting. Because the height of the proximal support pillars 331 is approximately the same as the height of the distant support pillars 335, the upper surface 313 looks relatively flat. When customers place a bowl, plate, cup or other containers to be heated on the upper surface 313, food in the bowl, plate or cup will not spill out.

As shown in FIG. 19, in the application, the cross-section of the proximal support pillars 331 is cross-shaped, and the cross-section of the distant support pillars 335 is strip-shaped with the middle sticking out, wherein the number of the distant support pillars 335 is greater than the number of the proximal support pillars 331. By setting the cross-section of the proximal support pillars 331 to be strip-shaped with the middle sticking out, heat dissipation and ventilation between different support pillars 33 are facilitated.

Figure 20:
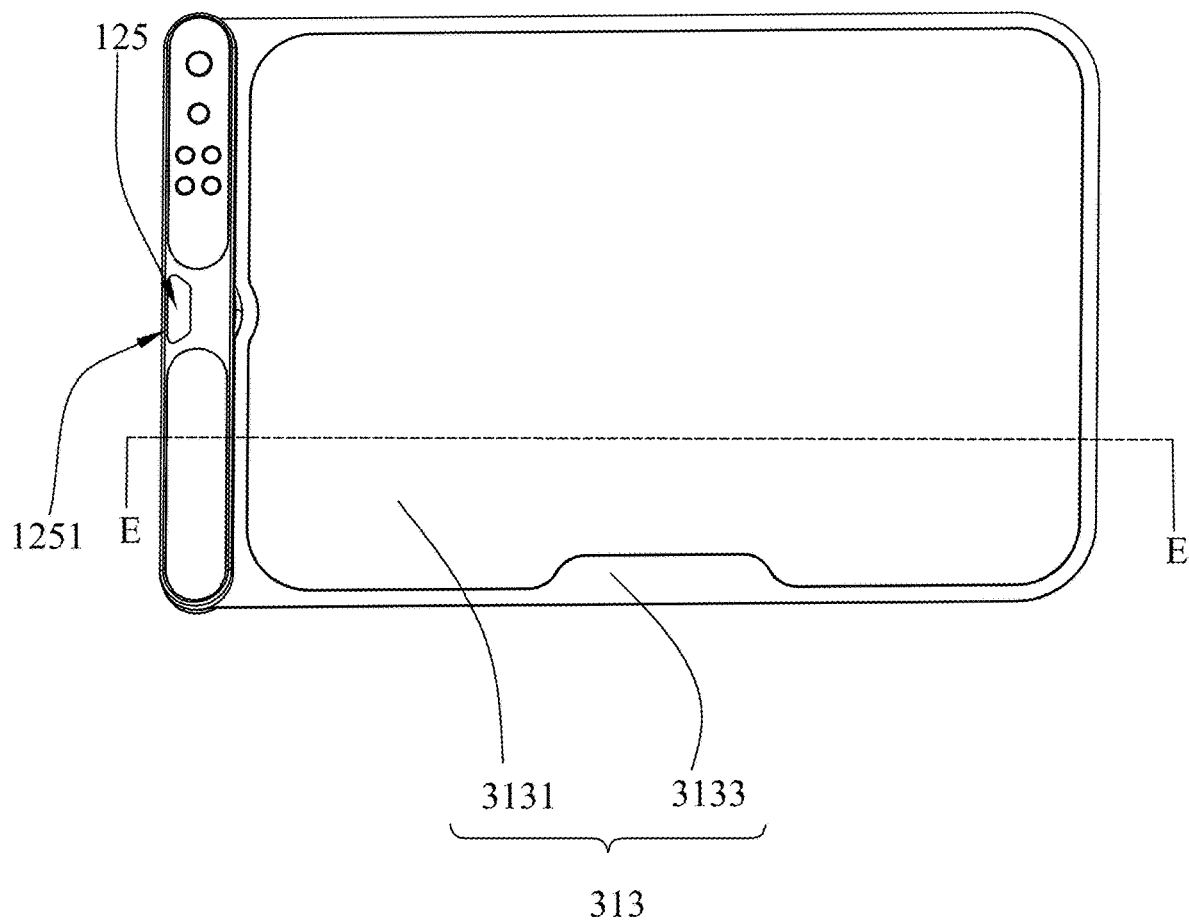
FIG. 20 is a schematic diagram of the heating pad 001 in an unrolled state according to the application.

Referring to FIG. 20 which is a schematic diagram of the heating pad 001 in an unrolled state according to the application, the upper surface 313 includes a central region 3131 and a marginal region 3133. The central region 3131 and the marginal region 3133 form the upper surface 313 jointly. The area of the central region 3131 is greater than the area of the marginal region 3133, and a height difference exists between the central region 3131 and the marginal region 3133. The central region 3131 is higher than the marginal region 3133, and the height difference between the central region 3131 and the marginal region 3133 is 0.1-1 mm. In a case where the height difference exists between the central region 3131 and the marginal region 3133, if liquid spills onto the upper surface 313 in use of the upper surface 313 of the pad body 31, the liquid may easily flow from the central region 3131 to the marginal region 3133 and will not be accumulated on the upper surface 313 for a long time. Meanwhile, the upper surface 313 is divided into the central region 3131 and the marginal region 3133, and the central region 3131 is set as a heating region, such that users may be informed that food to be heated should be placed in the central region 3131 to the maximum extent to improve heating efficiency. In this case, referring to FIGS. 17 and 20, the heating wire 35 is arranged in a region, corresponding to the central region 3131, of the lower surface 311.

Figure 21:
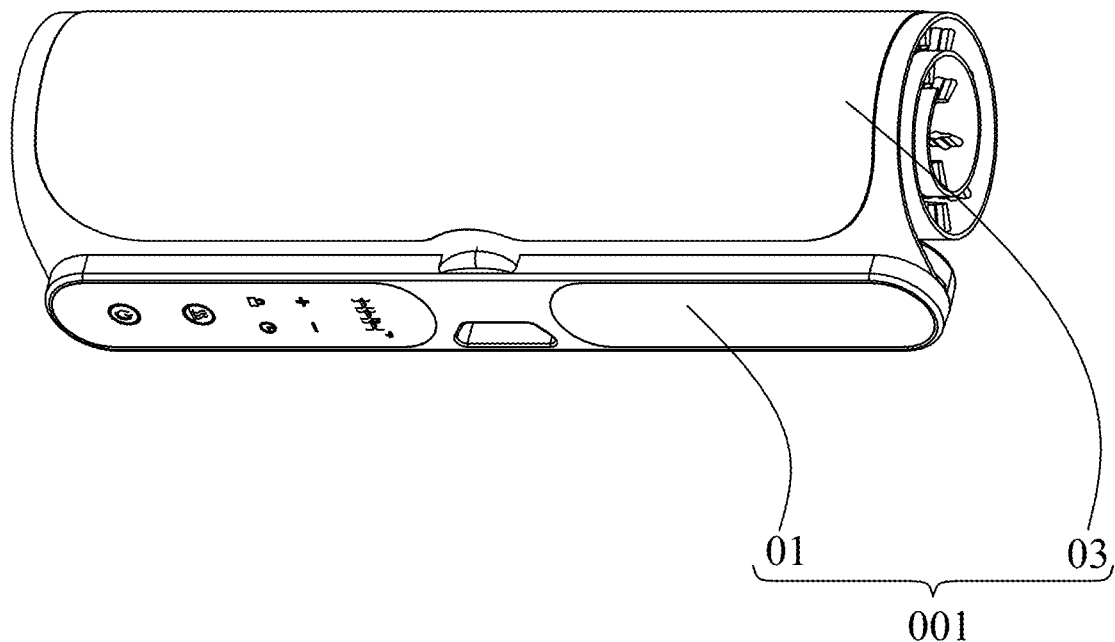
FIG. 21 is a schematic diagram of the heating pad 001 in a rolled-up state according to the application.
Figure 22:
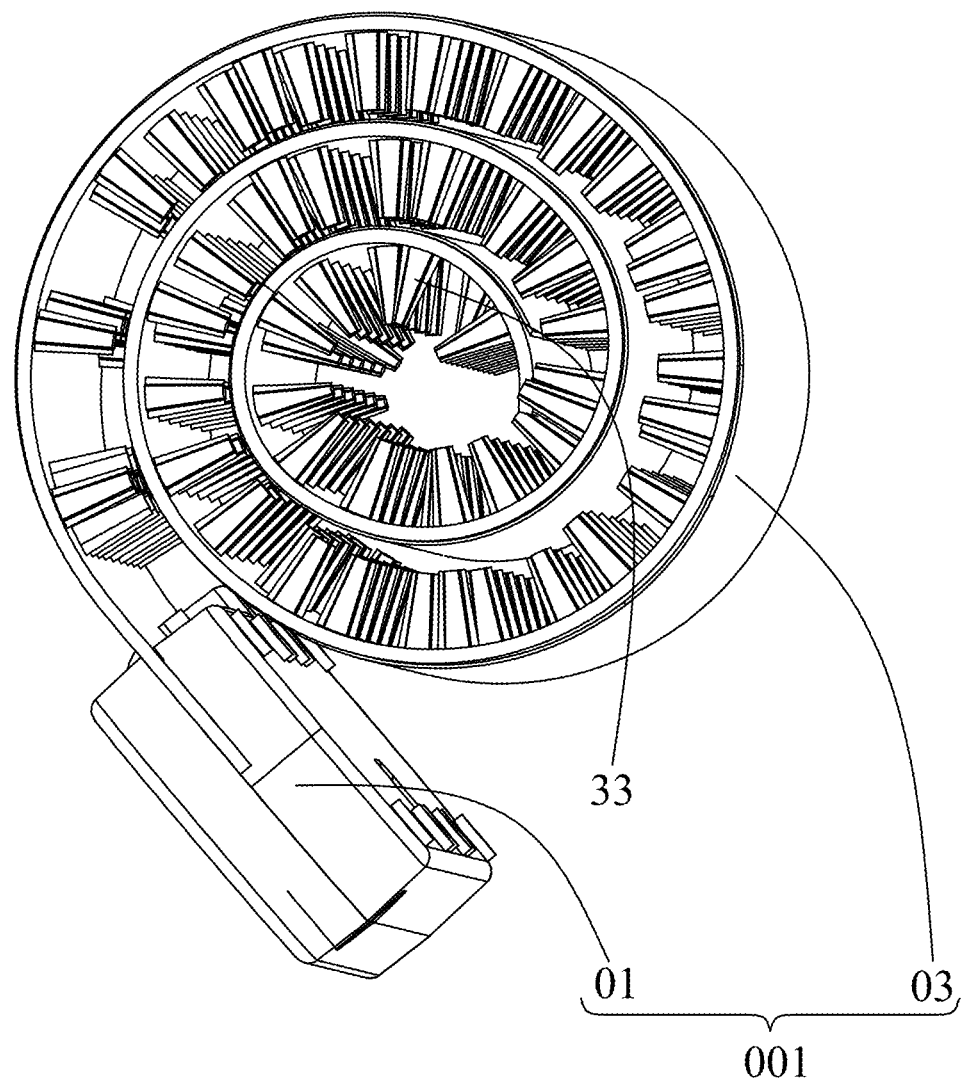
FIG. 22 is a schematic diagram of the heating pad 001 in the rolled-up state from another view according to the application.

Refer to FIGS. 20, 21 and 22, wherein FIG. 21 is a schematic diagram of the heating pad 001 in a rolled-up state according to the application, and FIG. 22 is a schematic diagram of the heating pad 001 in the rolled-up state from another view according to the application. The operation region 01 of the heating pad 001 in the application is elongated. To be specific, the operation region 01 in the application is in the shape of an elongated track on the whole, and two ends of the operation region are arc-shaped. After use, customers may roll up the heating pad 001; in the rolling-up process, the heating region 03 is rotated around the operation region 01; and by repeatedly rotating the heating region 03 around the operation region 01, the whole heating pad 001 is finally shaped like a cylinder, wherein, the operation region 01 made from a rigid material is the central axis of the cylinder, and the heating region 03 made from a flexible material is continuously wound around the central axis from inside to outside to form the cylinder finally. From inside to outside, the distance between different layers of the heating region 03 is approximately equal to the height of the support pillars 33. Because heat of the heating pad 001 is not completely dissipated when customers roll up the heating pad 001 in this way after use, the support pillars 33 are arranged in the application to form gaps between different layers of the heating region 03 in the rolling-up process, and different support pillars 33 are arranged in an array to ensure that heat in different layers of the heating region 03 is better dissipated, thus reducing potential safety hazards caused by overheat. According to another rolling-up method, first, the heating region 03 made from a flexible material may be rolled up; then, the operation region 01 made from a rigid material is wound around the outermost layer of the heating region 03 to support and protect the heating pad 001 in the rolled-up state, such that space is saved when the heating pad 001 is not used, and the heating pad 001 is unlikely to be unrolled, which may otherwise cause inconvenient in the storage process.

Figure 23:
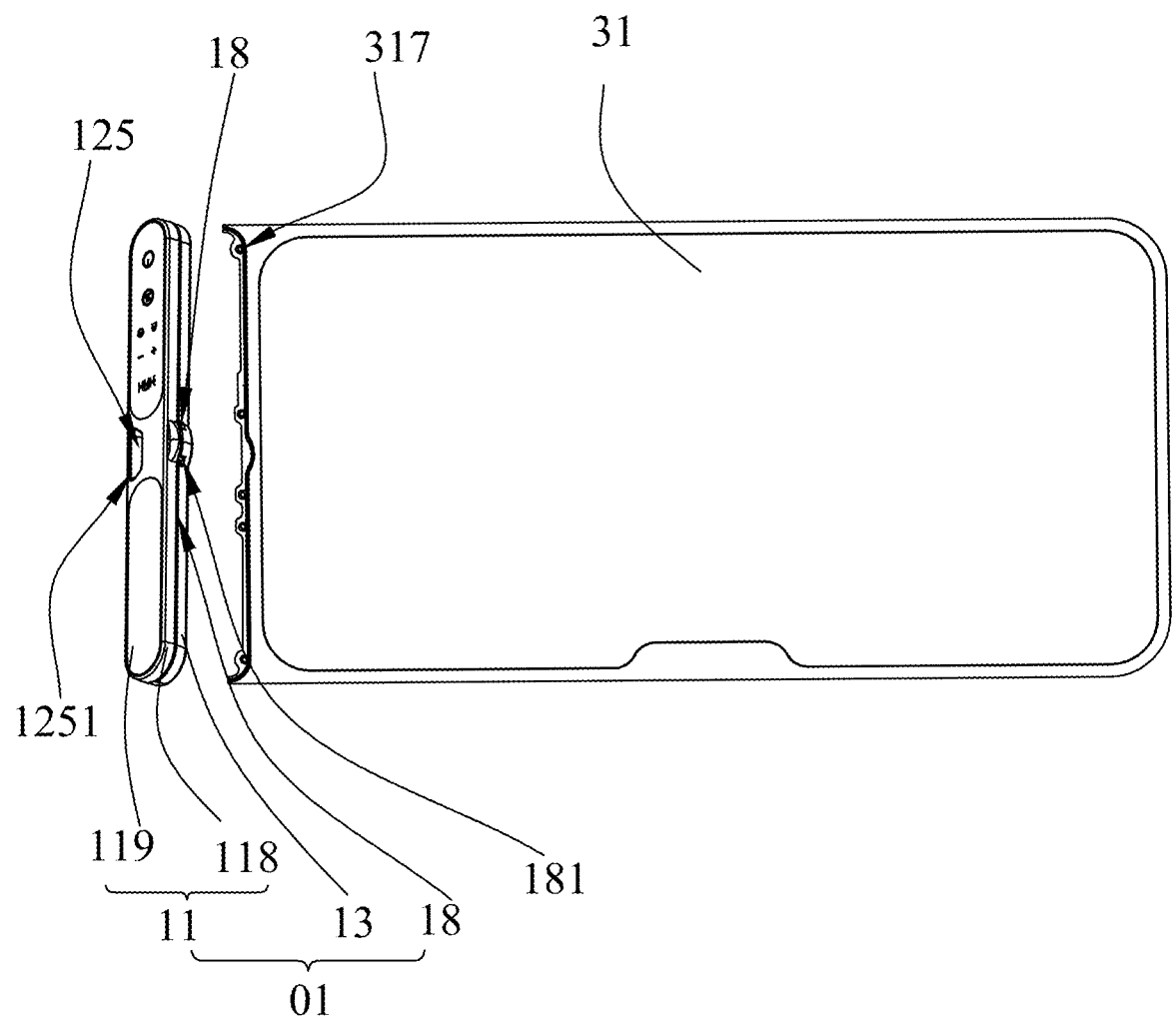
FIG. 23 is an exploded structural view of an operation region and a heating region according to the application.
Figure 24:
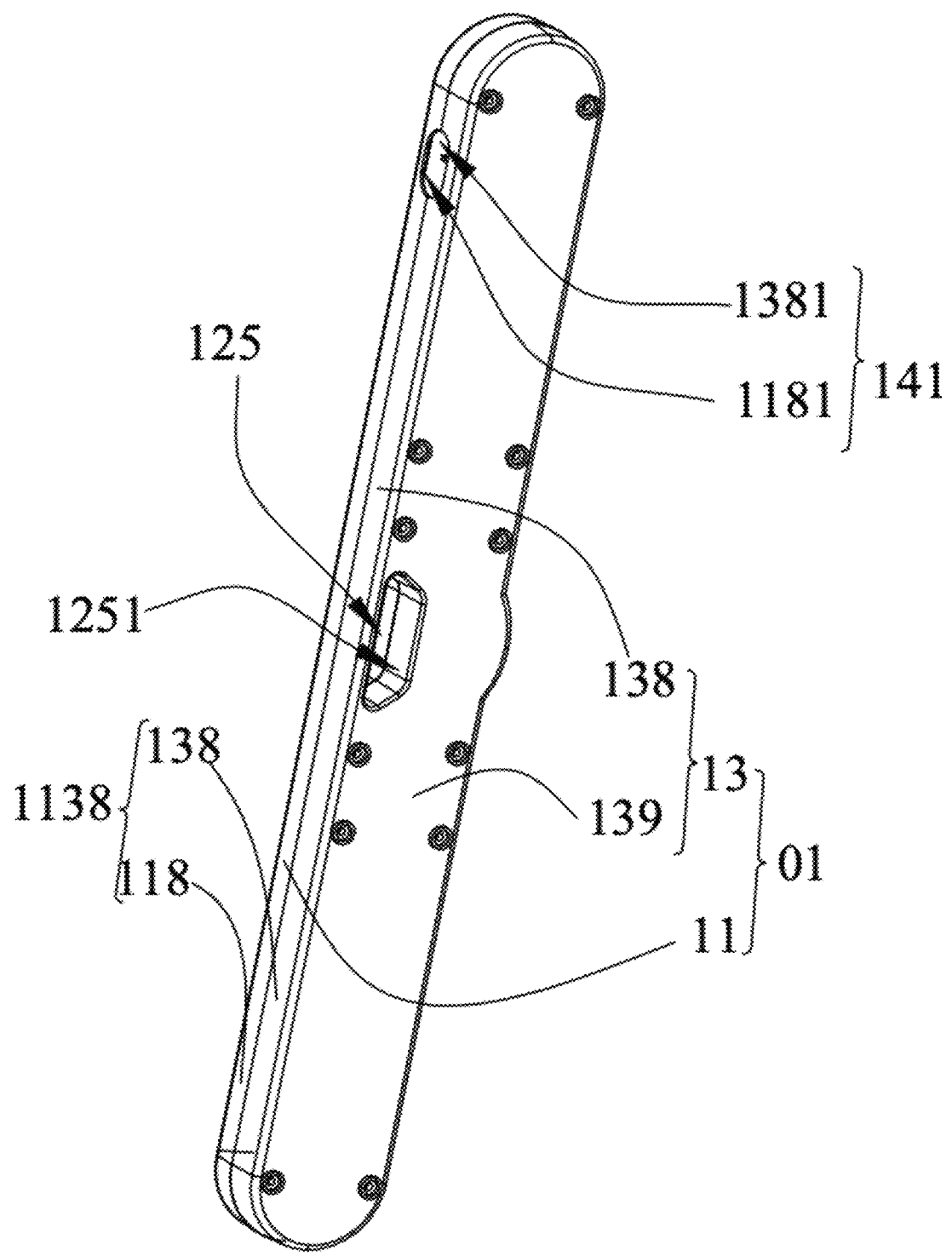
FIG. 24 is a schematic structural diagram of the operation region from one view according to the application.
Figure 25:
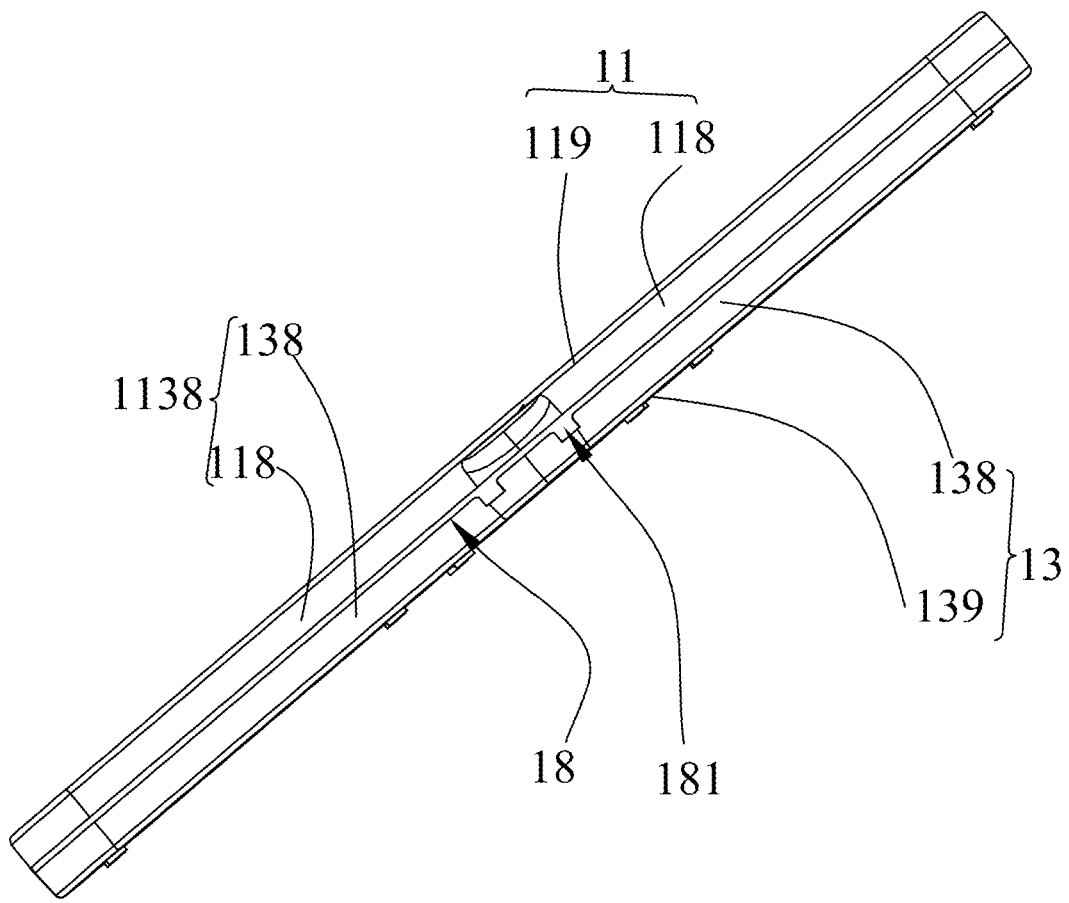
FIG. 25 is a schematic structural diagram of the operation region from another view according to the application.

Refer to FIGS. 23, 24 and 25, wherein FIG. 23 is an exploded structural view of the operation region and the heating region according to the application, FIG. 24 is a schematic structural diagram of the operation region from one view, and FIG. 25 is a schematic structural diagram of the operation region from another view. The operation region 01 includes an upper shell 11, and the upper shell 11 is a shell structure provided with a through-hole 111. The shape of the through-hole 111 is not specifically limited, and the through-hole 111 may be oval, circular, quadrilateral, triangular, or the like. The number of the through-holes 111 is not specifically limited, either. One large through-hole 111 may be arranged, or a plurality of through-holes 111 may be arranged. In the application, a plurality of through-holes 111 in different shapes, including quadrilateral through-holes and circular through-holes, are arranged.

The operation region 01 further includes a lower shell 13, which is arranged opposite to the upper shell 11. The upper shell 11 and the lower shell 13 are fixedly connected to form a receiving space. The upper shell 11 and the lower shell 13 may be fixedly connected by clamping, screw connection, gluing, interference fit, riveting, hinged connection, or the like. In this embodiment, the upper shell 11 and the lower shell 13 are fixedly connected by screw connection.

Figure 26:
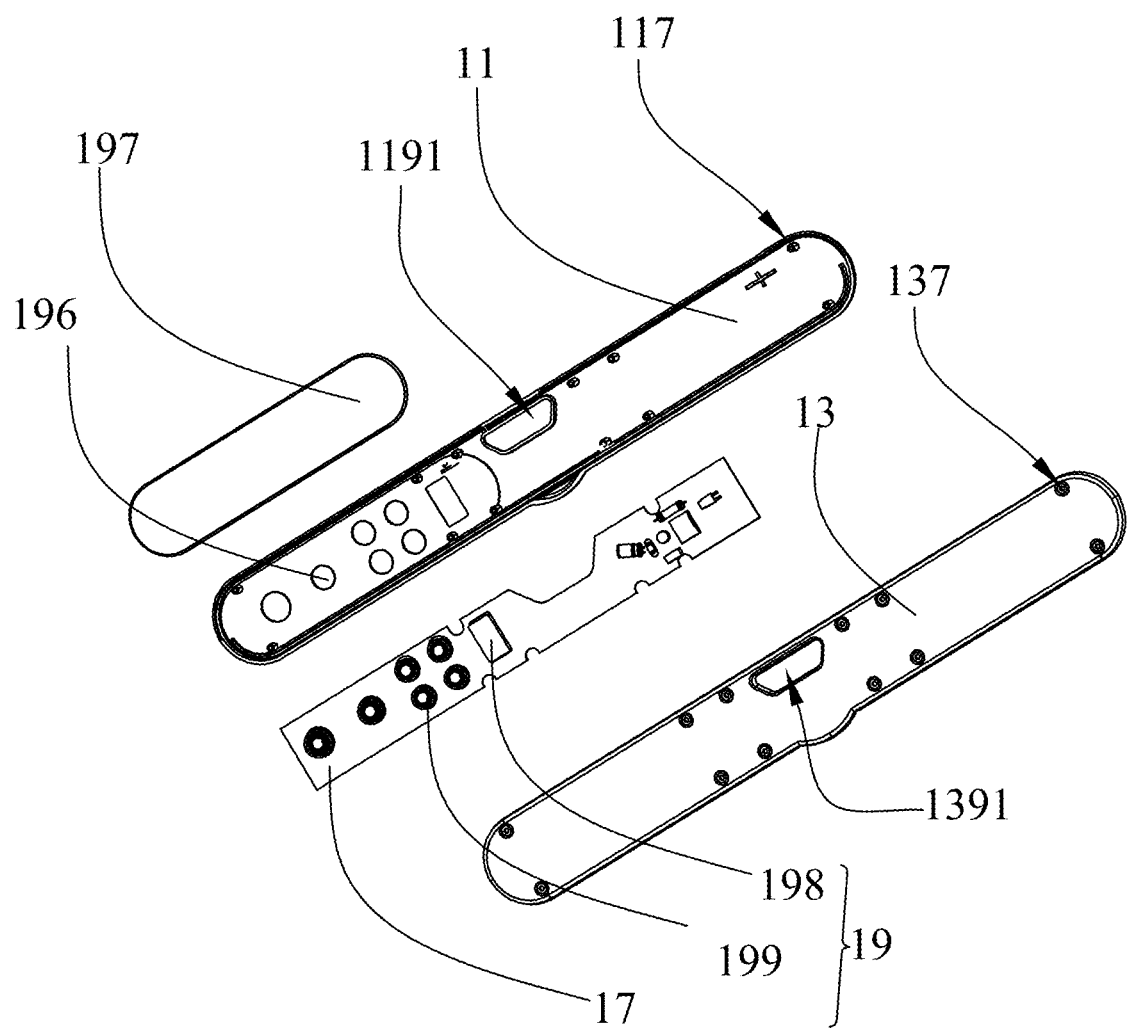
FIG. 26 is an exploded structural view of the operation region according to the application.

Refer to FIGS. 20, 23, 24, 25 and 26, wherein FIG. 26 is an exploded view of the operation region 01. Wherein, the upper shell 11 includes an upper peripheral wall 118 and a top wall 119, and the upper peripheral wall 118 and the top wall 119 form the upper shell 11. The lower shell 13 includes a lower peripheral wall 138 and a bottom wall 139, and the lower peripheral wall 138 and the bottom wall 139 form the lower shell 13. The top wall 119 and the bottom wall 139 are arranged opposite to each other, and the upper shell 11 and the lower shell 13 are arranged opposite to each other. Wherein, the upper peripheral wall 118 and the lower peripheral wall 138 form a peripheral wall 1138 of the operation region. An upper recess 1191 is formed in a surface of the top wall 119, a lower recess 1391 is formed in the bottom wall 139, and the upper recess 1191 communicates with the lower recess 1391 to form a storage through-hole 125. The storage through-hole 125 includes an inner wall 1251, and a distance between the inner wall 1251 and the peripheral wall 1138 is at least 1 mm. When the heating pad 001 needs to be stored, a string passes through the storage through-hole 125, and then, the whole heating pad 001 is hung on a wall by means of the string; or, the heating pad 001 is rolled up to be in a cylindrical shape by means of the string. In addition, in daily use, operators may stretch their fingers across the storage through-hole 125 to carry the heating pad 001 easily.

It should be noted that in the daily cleaning process, the heating pad 001 may be vertically hung by means of an external nail or hook via the storage through-hole 125; then, the pad body 31 is cleaned with tap water, and at this moment, under the action of gravity of the tap water, the tap water will not flow into the operation region 01 where the storage through-hole 125 is located, such that the tap water or other liquids are prevented from entering the operation region 01, which may otherwise damage a circuit board 17 in the operation region 01.

It should be further noted that in some preferred embodiments, the top wall 119 is axisymmetric and has a symmetry axis, and the symmetry axis extends through the region where the storage through-hole 125 is located.

In some other preferred embodiments, the top wall 119 is axisymmetric and has a symmetry axis, which is defined as a first symmetry axis. The storage through-hole 125 is axisymmetric and has a symmetry axis, which is defined as a second symmetry axis. The first symmetry axis overlaps with the second symmetry axis. In this case, because the first symmetry axis overlaps with the second symmetry axis, when the heating pad 001 is hung by means of the storage through-hole 125, the heating pad 001 will not incline or swing and droops vertically under the action of gravity to be cleaned and dried easily.

In some other preferred embodiments, the peripheral wall 1138 includes: a side close to the pad body 31, which is defined as an inner side; and a side away from the pad body 31, which is defined as an outer side. Wherein, the region where the storage through-hole 125 is close to the outer side.

It should be noted that the upper shell 11 and the lower shell 13 are made from a rigid material. Specifically, the rigid material may be at least one of plastic, metal and carbon fibers.

Further referring to FIGS. 17, 23, 24, 25 and 26, a slot 18 is formed between the upper shell 11 and the lower shell 13. Specifically, the slot 18 is formed in the upper peripheral wall 118 or the lower peripheral wall 138, the slot 18 is long and narrow on the whole, and the pad body 31 enters the receiving space by passing through the slot 18. The height of the slot 18 ranges from 1 mm to 20 mm. Wherein, the slot 18 is provided with at least one wiring notch 181, and the heating wire 35 enters the receiving space via the wiring notch 181.

It should be noted that the height of the slot 18 matches the thickness of the pad body 31, the width of the slot 18 matches the width of the pad body 31, and the pad body 31, the upper shell 11 and the lower shell 13 are fixedly connected. It should be noted that the fixed connection between the pad body 31, the upper shell 11 and the lower shell 13 may be one or more of screw connection, riveting, gluing, interference fit, magnetic attraction and the like. In the application, the pad body 31, the upper shell 11 and the lower shell 13 are fixedly connected by screw connection.

The pad body 31 is provided with at least two mounting holes 317, the upper shell 11 is provided with at least four upper mounting holes 117, and the lower shell 13 is provided with at least four lower mounting holes 137. When the pad body 31 is inserted into the slot 18, the upper mounting holes 117, the mounting holes 317 and the lower mounting holes 137 correspond to one another in position from top to bottom to allow screws to penetrate through. In this embodiment, an internal thread is arranged on an inner wall of at least one of each upper mounting hole 117, the corresponding mounting hole 317 and the corresponding lower mounting hole 137, and external screws sequentially penetrate through the upper mounting holes 117, the mounting holes 317 and the lower mounting holes 137 to fixedly connect the pad body 31, the upper shell 11 and the lower shell 13.

Because the height of the slot 18 matches the thickness of the pad body 31, which means that the height of the slot 18 is approximately the same as the thickness of the pad body 31, when the pad body 31, the upper shell 11 and the lower shell 13 are connected with screws, other positions, except the space where the pad body 31 is received by passing through the slot 18, between the upper shell 11 and the lower shell 13 are directly connected by means of the screws penetrating through the lower mounting holes 137 and the upper mounting holes 117, such that the upper shell 11 and the lower shell 13 are fitted together, and a cracking region is avoided.

It should be noted that in some embodiments of the application, the number of the lower mounting holes 137 is twice the number of the mounting holes 317, and the number of the upper mounting holes 117 is also twice the number of the mounting holes 317.

For example, the number of the lower mounting holes 137 and the number of the upper mounting holes 117 are 12, and the number of the mounting holes 317 is 6.

Referring to FIGS. 16, 24 and 26, the operation region 01 further includes a wire (not shown), a circuit board 17, an operation interface 19 and a wiring terminal 14. The wiring terminal 14, the circuit board 17, the operation interface 19 and the heating wire 35 are electrically connected by means of the wire.

In the application, an upper notch 1181 is formed in the upper peripheral wall 118, a lower notch 1381 is formed in the lower peripheral wall 138, and the upper notch 1181 corresponds to the lower notch 1381 in position to form a wiring port 141; and the wiring terminal 14 is located at the wiring port 141 and configured to being electrically connected to an external power supply.

In some other preferred embodiments, the peripheral wall 1138 includes: a side close to the pad body 31, which is defined as an inner side; and a side away from the pad body 31, which is defined as an outer side. Wherein, the wiring port 141 is formed in the outer side.

In the application, the circuit board 17 is mounted in the receiving space. The operation interface 19 is arranged at the through-hole 111 and electrically connected to the circuit board 17. The shape of the operation interface 19 matches the shape of the through-hole 111. In actual operation, the operation interface 19 sends an electric signal to the circuit board 17 to control the temperature of the heating wire 35 to reach a preset desired temperature.

Referring to FIGS. 17, 23 and 25, in actual use, the wiring terminal 14 is connected to the external power supply; then, power is input to the circuit board 17, and the circuit board 17 determines and processes an input current to eventually realize the function of heating the heating wire 35, detecting the temperature of the heating wire 35, controlling the heating time of the heating wire 35, or the like. The operation interface 19 sends an electric signal to the circuit board 17 to control the temperature of the heating wire 35 to reach the preset desired temperature. In this case, operators input a required parameter by performing an operation on the operation interface 19; then, the operation interface, when recognizing the parameter input by the operators, sends an electric signal to the circuit board 17 to control the temperature of the heating wire 35 to reach the preset desired temperature.

In conjunction with the heating method and heating circuit illustrated in FIGS. 1-13 and the heating pad 001 in the application, the operation steps of the heating pad 001 are expounded, wherein the operation interface 19 sends the electric signal to the circuit board 17 to control the temperature of the heating wire 35 to reach the preset desired temperature approximately as follows:

an operator plugs a plug of a power line into the wiring terminal 14;
the operator performs an operation on the operation interface 19, and the operation interface 19 sends the electric signal to the circuit board 17; and
the processing module 03 receives the electric signal to control the temperature of the heating wire 35 to reach the preset desired temperature.

It should be noted that the desired temperature may be a value, which is preset as actually needed before delivery and is stored in the heating pad 001, and the value of the desired temperature will not be enumerated here. The specific value range of the desired temperature is not limited in the application.

In some embodiment of the application, the preset desired temperature is written into the processing module 03 in advance. When the heating pad 001 is used by an operator, the processing module 03 compares the actual temperature of the heating wire with the preset desired temperature to further heat the heating wire or stop heating the heating wire. For example, in a case where the processing module 03 recognizes that the actual temperature of the heating wire is lower than the preset desired temperature, the heating wire is further heated. In a case where the processing module 03 recognizes that the actual temperature of the heating wire is higher than or equal to the preset desired temperature, the heating wire is stopped from being heated.

It should be noted that the technical solution provided by the application allows for multiple preset desired temperatures corresponding to different objects to be heated. For example, for milk, the preset desired temperature is 50° C.; for clothes, the preset desired temperature is 60° C.; and for food, the preset desired temperature is 100° C. This will not be enumerated here.

It should be noted that the operation interface 19 may be at least one of a touch screen and a display screen. In a case where the operation interface 19 is the touch screen, the operator may operate a touch button on the touch screen to change the operating time or operating temperature of the heating pad 001 or to turn on or off the heating pad 001. In a case where the operation interface 19 is the display screen, the operation interface 19 is provided with a mechanical button, which is used for changing the operating time or operating temperature of the heating pad 001 or turning on or off the heating pad 001.

The touch screen may be at least one of a capacitive touch screen, an electromagnetic touch screen and a resistive touch screen. When the heating pad is used by an operator, the operator may touch the touch screen with fingers to complete an operation on the heating pad, for example, turning on the heating pad, adjusting the operating temperature of the heating pad, adjusting the operating time of the heating pad or locking the heating pad.

The display screen may be at least one of an LED display screen, an LCD display screen and an LOD display screen.

Referring to FIGS. 16. 17, 20 and 26, in some embodiments of the application, the operation interface 19 may further include at least one button 199 and at least one display 198, and the button 199 and the display 198 are electrically connected. Wherein, the display 198 is configured to display a temperature value, and the button 199 is configured to adjust a heating parameter of the heating pad 001, for example, the operator may change the heating time, heating temperature or other parameters of the heating pad 001 by pressing the button 199. In addition, in some embodiments, a protective cover 197 may be arranged on the surface of the button 199 and the surface of the display 198.

It should be noted that the operation interface 19 matches the protective cover 197 in overall shape, and the upper shell 11 is provided with a mounting region to allow the protective cover 197 to be mounted thereon.

Wherein, the protective cover 197 may be mounted on the upper shell 11 by at least one of gluing, screw connection, magnetic attraction and clamping. In addition, the protective cover 197 is made from a transparent or semitransparent material, such that the operator may see parameters displayed by the button 199 and the display 198 through the protective cover 197. The protective cover may be made from at least one of glass, plastic and ceramic.

In a preferred embodiment, the position, corresponding to the button 199, of the protective cover 197 is marked with a corresponding operation hint. For example, the position corresponding to a temperature-rise button 199 is marked with "+", and the position corresponding to a temperature-fall button 199 is marked with "−".

In a preferred embodiment, the button 199 may be a capacitive touch button, the circuit board 17 may include a sensor chip and an induction electrode 196 corresponding to the button 199. The induction electrode 196 may be a metal sheet or a spring. In this embodiment, the induction electrode 196 is a spring. The sensor chip is configured to sense an electric field signal of the induction electrode 196, and the circuit board 17 is configured to process of the electric field signal.

It should be noted that the sensor chip may be formed by a microprocessor and an analog circuit. When the operator touches the induction electrode 196 by means of the button 199, the electric field on the induction electrode 196 will be changed, and the sensor chip may detect the change of the electric field by means of the analog circuit.

In one embodiment of the application, the circuit board is configured to receive and process the signal sent from the sensor chip. The circuit board may be formed by a digital circuit and a logic circuit and implements a touch operation by processing an electric field change signal generated by the induction electrode 196. In this way, by adopting touch induction, the button 199 may be slightly touched to trigger a response without being physically pressed. The capacitive touch button has the advantages of being waterproof, durable, sensitive, and the like.

In one embodiment of the application, at least one light emitting element is arranged in the circuit board 17. Specifically, the light emitting element in the application is an LED lamp, and the position of the LED lamp in the circuit board 17 corresponds to the position of the at least one button 199.

The button 199 includes at least one of an on/off button, an unlocking button, a timing button, a temperature-rise button and a temperature-fall button. Wherein, patterns of the on/off button, the unlocking button, the timing button, the temperature-rise button and the temperature-fall button are different, such that the operator may easily distinguish functions corresponding to different buttons.

In use, for example, when the operator presses the temperature-rise button with a finger, the temperature of the heating pad 001 starts to rise; at the same time, the sensor chip senses a change of the electric field signal of the induction electrode 196 at the position of the temperature-rise button to turn on the LED lamp corresponding to the temperature-rise button, and light emitted by the LED lamp passes through the pattern corresponding to the temperature-rise button to fulfill a visual effect that the temperature-rise button is illuminated, so as to remind the operator that the heating pad 001 has entered a temperature-rise phase. Meanwhile, the processing module in the circuit board 17 controls the heating wire 35 to start to be heated to continuously increase the temperature of the heating pad 001.

In the application, a carrier of the heating circuit is the circuit board 17, and the heating circuit fulfills all functions with the circuit board 17 as the carrier. "Module", "unit" and "sub-unit" mentioned in the application are all individual regions with different functions divided by the applicant.

Figure 27:
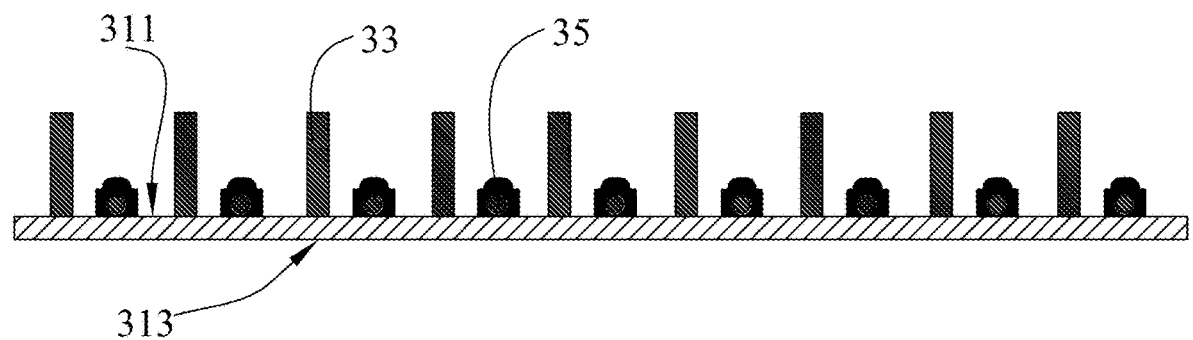
FIG. 27 is a sectional view of a heating region 03 of the heating pad 001 according to the application.
Figure 28:
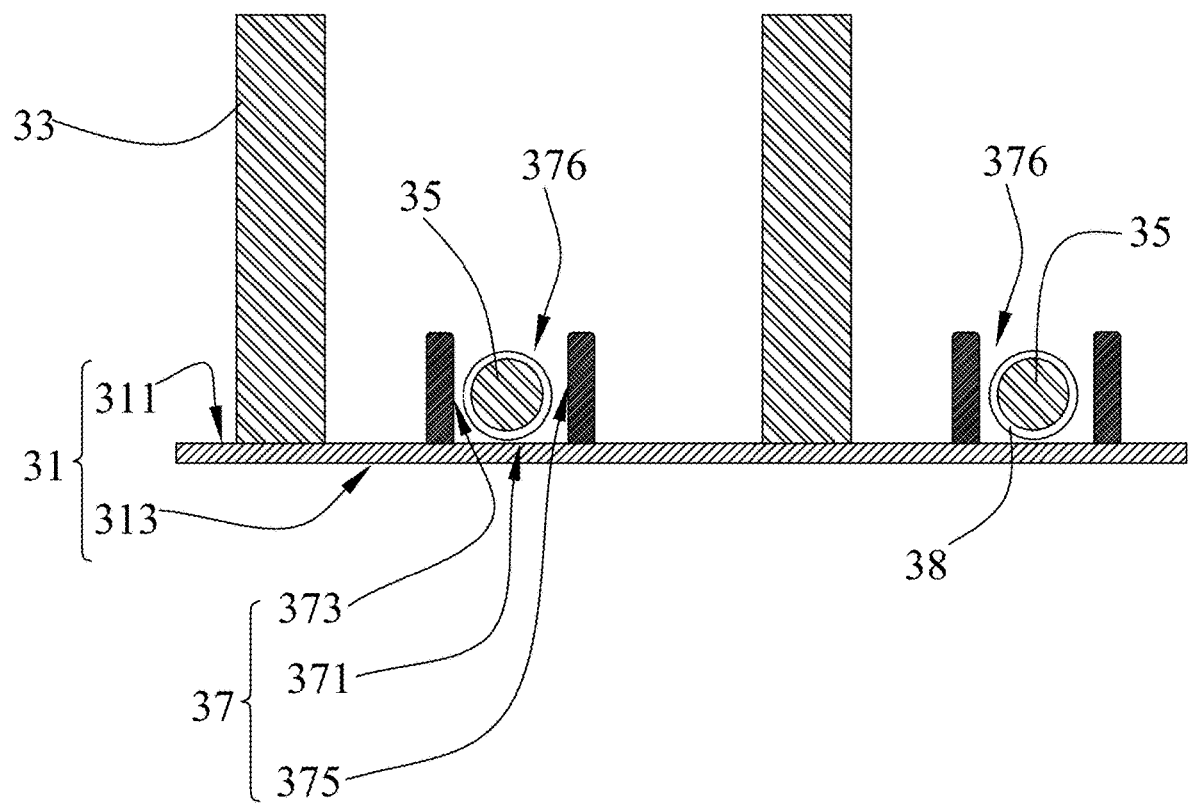
FIG. 28 is a partial sectional view of the heating region 03 of the heating pad 001 according to the application.
Figure 29:
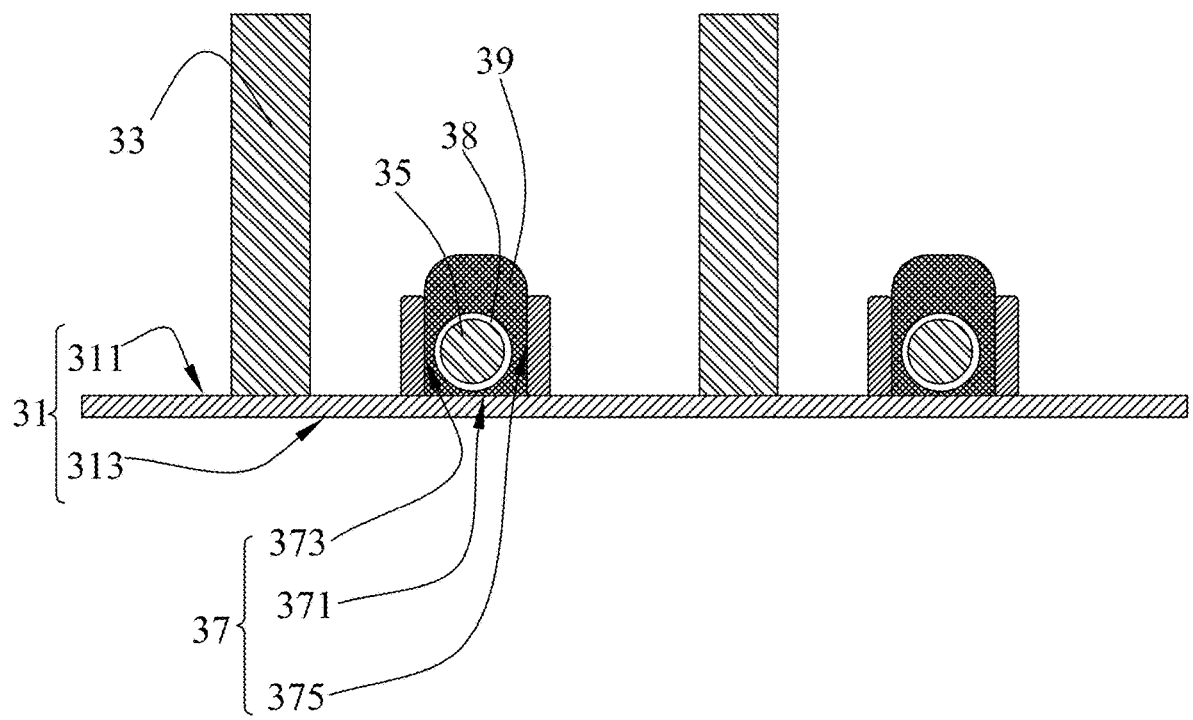
FIG. 29 is a partial sectional view of the heating region 03 according to another embodiment of the application.

As shown in FIG. 27 which is a sectional view of the heating region 03 of the heating pad 001 according to the application, FIG. 28 which is a partial sectional view of the heating region 03 of the heating pad 001 according to the application and FIG. 29 which is a partial sectional view of the heating region 03 according to another embodiment of the application, in another embodiment of the application, the heating region 03 includes mounting grooves 37 provided with openings, wherein the mounting grooves 37 are formed in the lower surface 311, and the openings are away from the upper surface 313. The mounting grooves 37 are located in the gaps between the different support pillars 33. Each mounting groove 37 includes a bottom wall 371, a first side wall 373 and a second side wall 375, wherein the second side wall 375 and the first side wall 373 are arranged opposite to each other.

The bottom wall 371, the first side wall 373 and the second side wall 375 are designed integrally, and a slot space 376 is defined by the bottom wall 371, the first side wall 373 and the second side wall 375. The heating wire 35 is arranged in the slot space 376.

It should be noted that the drawings illustrate the bottom wall 371, the first side wall 373 and the second side wall 375 according to only one embodiment. In other embodiments, the bottom wall 371, the first side wall 373 or the second side wall 375 may be a curved surface, a flat surface, an arc surface, a fold surface or other regular flat surfaces. That is to say, the shape of the bottom wall 371, the first side wall 373 and the second side wall 375 is not specifically limited here as long as the slot space 376 may be defined by the bottom wall 371, the first side wall 373 and the second side wall 375.

Figure 30:
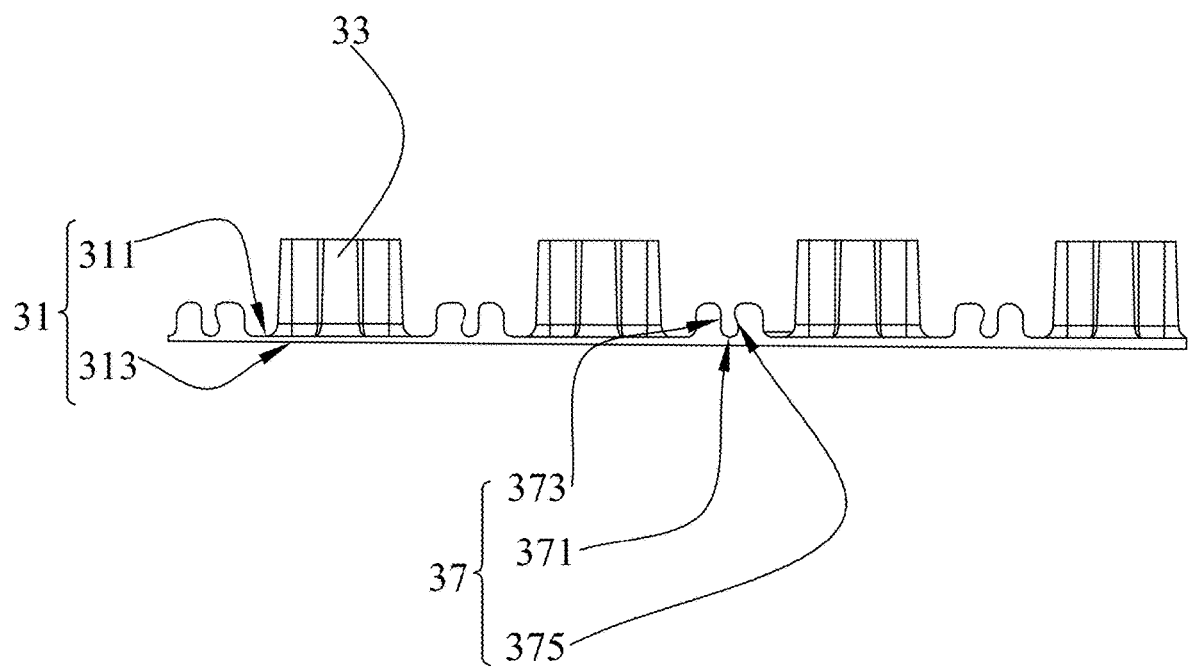
FIG. 30 is a schematic diagram of mounting grooves according to another embodiment.

As shown in FIG. 30 which is a schematic diagram of the mounting grooves according to another embodiment, in another embodiment of the application, the bottom wall 371 extends towards an opening of the slot space 376, and the slot space 376 is narrowed down gradually. That is to say, in an extension direction of the mounting groove from the upper surface to the lower surface, the bottom wall 371 extends towards the opening of the slot space 376, and the distance between the first side wall and the second side wall decreases gradually. By gradually decreasing the distance between the first side wall and the second side wall, a second packaging layer 39, a first packaging layer 38 and the heating wire 35 may be better fixed in the slot space 376. Considering that the second packaging layer 39, the first packaging layer 38 and the heating wire 35 may be squeezed out from the slot space 376 when the heating pad 001 is continuously bent and spread, the opening of the slot space 376 is designed to be narrowed down to prevent the second packaging layer 39, the first packaging layer 38 and the heating wire 35 from being squeezed out from the slot space 376.

It should be noted that in the whole extension process of the bottom wall 371 towards the opening of the slot space 376, the distance between the first side wall 373 and the second side wall 375 gradually decreases in a certain phase.

In one embodiment of the application, in the whole extension process of the bottom wall 371 towards the opening of the slot space 376, the distance between the first side wall 373 and the second side wall 375 increases gradually and then decreases gradually.

As shown in FIGS. 28 and 29, in another embodiment of the application, the heating region 03 further includes an insulation and heat-conduction layer 38 and a glue filler 39. The insulation and heat-conduction layer 38 wraps around the heating wire 35 to fulfill an insulation and heat-conduction effect. The glue filler 39 is poured into the slot space 376 and packages the heating wire 35 and the insulation and heat-conduction layer 38 in the slot space 376. Wherein, the height of the first side wall 373 is approximately the same as the height of the second side wall 375, and the height of the glue filler 39 is greater than the height of the first side wall 373 and is also greater than the height of the second side wall 375. The heating wire 35 is made from a heating metal.

In an actual machining process, the process steps are as follows:

Step 1, the heating wire 35 wrapped with the insulation and heat-conduction layer 38 is placed in the slot space 376;

Step 2, the glue filler 39 is heated to be in a liquid state;

Step 3, the glue filler 39 in the liquid state is poured into the slot space 376; and Step 4, the glue filler 39 is cooled to be in a solid state.

Wherein, the insulation and heat-conduction layer 38 may be made from at least one of polyamide, polyethylene and polyvinylidene fluoride. The heating wire 35 may be made from At least one of Konstantan alloy, nickel silver, Nichrome alloy, or copper-nickel alloy. The temperature of the heating wire 35 changes with the change of the resistance of the heating wire 35, such that electric energy is converted into heat energy to realize heating.

The height of the glue filler 39 is greater than the height of the first side wall 373 and the height of the second side wall 375, which means that the glue filler 39 properly overflows from the slot space 376 in Step 3. It should be noted that in the case where the glue filler 39 properly overflows from the slot space 376, a height difference between the glue filler 39 and the first side wall 373 is not over 3 mm, and a height difference between the glue filler 39 and the second side wall 375 is not over 3 mm.

In this embodiment, by allowing the glue filler 39 to properly overflow from the slot space 376, the glue filler 39 may be poured into the slot space 376 as more as possible. In the operating process of the heating wire 35, expansion and contraction occur multiple time, and the good elasticity of the glue filler 39 may minimize a change of the size of the heating pad 01 caused by the expansion and contraction to prevent wrinkles or unevenness of the heating pad 001.

It should be noted that further referring to FIGS. 28 and 29, the heating wire 35 is cylindrical, the diameter of the heating wire 35 is less than the width of the opening, and a difference between the diameter of the heating wire 35 and the width of the opening is at least one 1 mm. In this way, the heating wire 35, after extending through the opening, may enter the slot space 376 more easily; and more space is reserved between the heating wire 35, the first side wall 373 and the second side wall 375, such that more glue filler 39 may be filled in the slot space 376.

In the embodiments of the application, more glue filler 39 is used for fixing the heating wire 35. First, by adopting more glue filler 39, emission of an unpleasant odor produced by the heating wire may be more effectively prevented; in addition, by adopting more glue filler 39, the change of the size of the heating pad 001 caused by expansion and contraction of the heating wire 35 may be reduced, thus preventing wrinkles or unevenness.

Figure 31A:
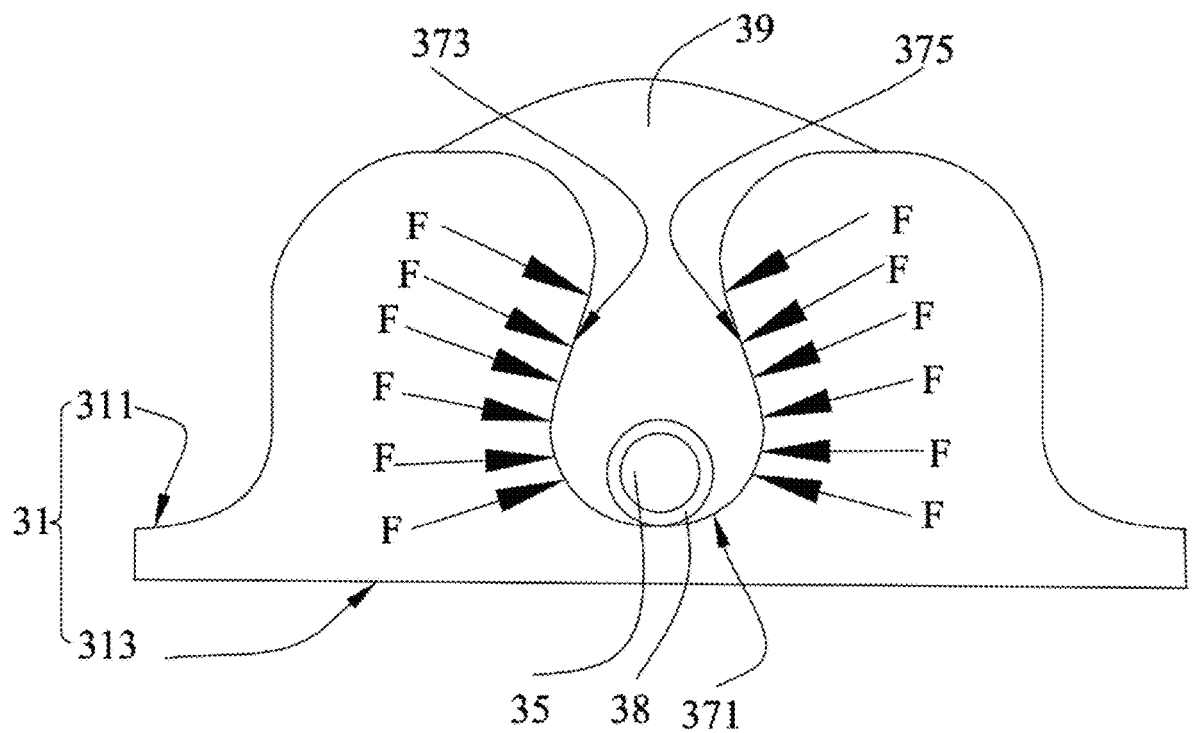
FIG. 31A is a schematic diagram of a slot space 376 according to the application.
Figure 31B:
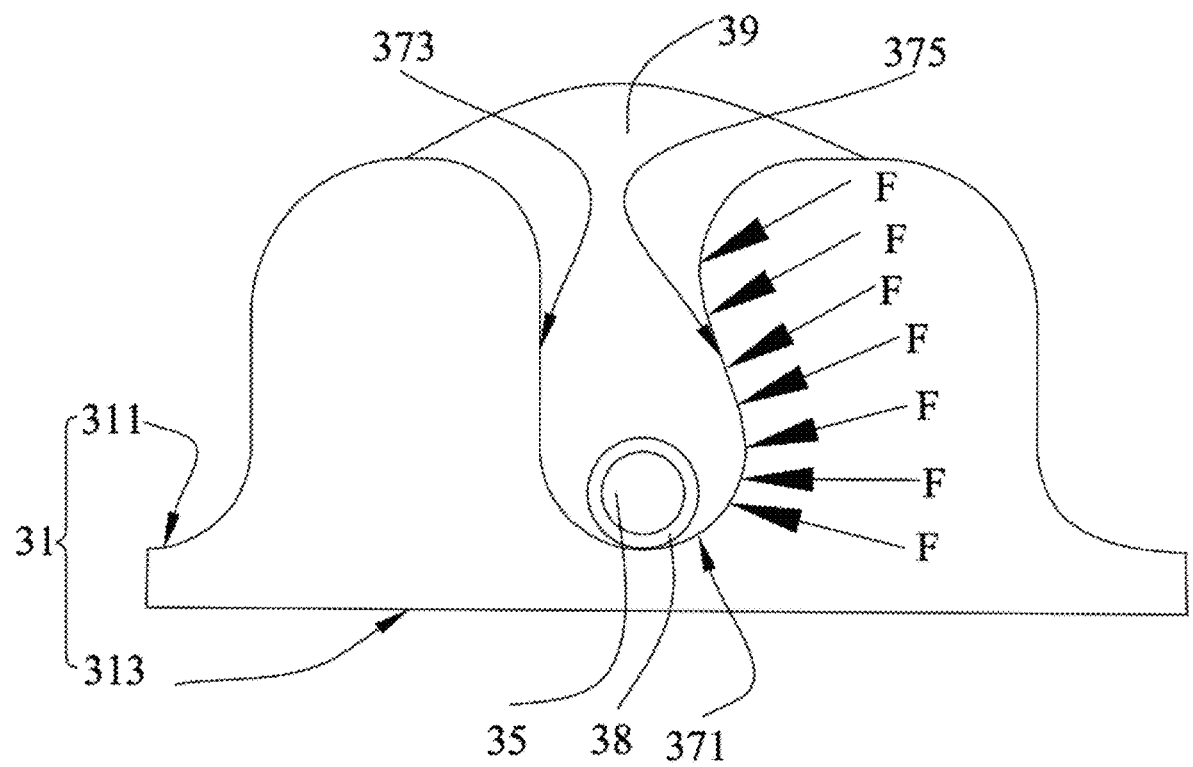
FIG. 31B is a second schematic diagram of the slot space 376 according to the application.
Figure 31C:
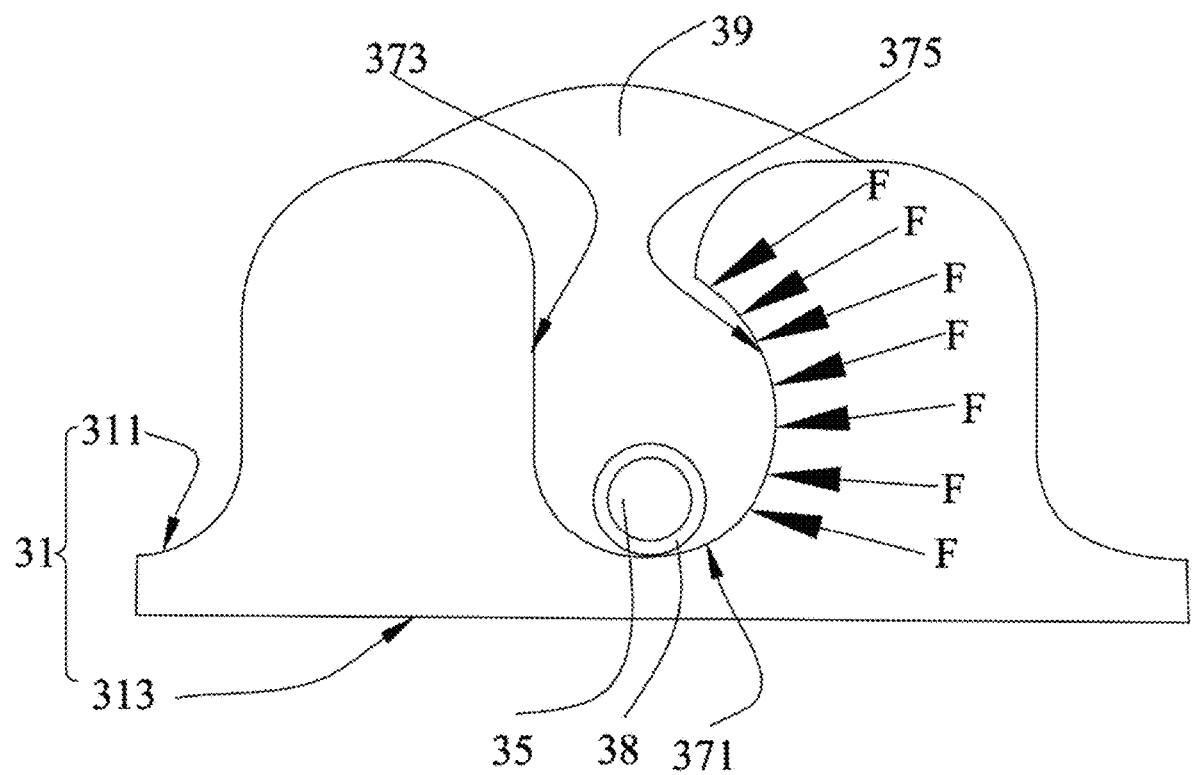
FIG. 31C is a third schematic diagram of the slot space 376 according to the application.

Refer to FIGS. 31A, 31B and 31C, wherein FIG. 31A is a schematic diagram of the slot space 376 according to the application, FIG. 31B is a second schematic diagram of the slot space 376 according to the application, and FIG. 31C is a third schematic diagram of the slot space 376 according to the application.

Referring to FIGS. 28 and 31A, in one embodiment of the application, the slot space 376 is provided with an opening, and in the extension process from the bottom wall 371 to the opening of the slot space 376, the distance between the first side wall 373 and the second side wall 375 decreases gradually. The slot space defined by the bottom wall 371, the first side wall 373 and the second side wall 375 is in the shape of a water drop on the whole, wherein the surface curvature of the first side wall 373 and the second side wall 375 change gently, such that a squeezing force F borne by the glue filler 39 is uniform when the heating wire 35 expands or contracts; and the squeezing force F is in the horizontal direction, such that the heating wire 35 is unlikely to disengage from the slot space. In addition, because the squeezing force F is in the horizontal direction, the situation where an excessive force is transferred onto the upper surface 313 after the squeezing force F is transferred onto the glue filler 39 is avoided, thus preventing wrinkles or unevenness of the upper surface 313.

Referring to FIGS. 28 and 31B, in a second embodiment of the application, the slot space 376 is provided with an opening, the first side wall 373 is perpendicular to the lower surface 311, an included angle between the second side wall 375 and the lower surface 311 is an acute angle, and in an extension direction from the bottom wall 371 to the opening, the distance between the first side wall 373 and the second side wall 375 decreases gradually. In this embodiment, with the first side wall 373 as a baseline, the heating wire 35 wrapped with the insulation and heat-conduction layer 38 is placed in the slot space along the first side wall 373, and then the glue filler 39 is poured into the slot space. Meanwhile, because the included angle between the first side wall 373 and the lower surface 311 is an acute angle and the squeezing force F is mainly from the second side wall 375 and is downward, the situation where an excessive force is transferred onto the upper surface 313 after the squeezing force F is transferred onto the glue filler 39 is avoided, thus preventing wrinkles or unevenness of the upper surface 313.

It should be noted that the included angle between the second side wall 375 and the lower surface 311 is an acute angle, and the acute angle is an included angle between a plane where the second side wall is located and a plane where the lower surface is located and ranges from 30° to 85°.

Referring to FIGS. 28 and 31C, in a third embodiment of the application, the slot space 376 is provided with an opening, the first side wall 373 is perpendicular to the lower surface 311, and in an extension direction from the bottom wall 371 to the opening, the distance between the first side wall 373 and the second side wall 375 decreases gradually. In this case, the second side wall is an arc wall, and the surface curvature of the second side wall 375 changes gently, such that the squeezing force F borne by the glue filler 39 is uniform when the heating wire 35 expands or contacts; and the squeezing force F is in a direction towards the center of a circle corresponding to the arc wall, such that the heating wire 35 is unlikely to disengage from the slot space. In addition, because the squeezing force F is in the direction towards the center of the circle corresponding to the arc wall, the situation where an excessive force is transferred onto the upper surface 313 after the squeezing force F is transferred onto the glue filler 39 is avoided, thus preventing wrinkles or unevenness of the upper surface 313.

It should be noted that compared with the prior art that protrusions are respectively arranged on the first side wall and the second side wall, the technical solutions illustrated in FIGS. 31A, 31B and 31C may reduce stress concentration between the first side wall 373 and the second side wall 375 in the expansion and contraction process of the heating wire 35 to prevent unevenness or wrinkles of the heating pad 001, which may otherwise lead to spillover of food placed on the upper surface 313 and cause scalds to users.

It should be noted that to solve the problem of stress concentration mentioned above, transition regions between the bottom wall 371, the first side wall 373 and the second side wall 375 in the application are rounded off. Preferably, the first side wall 373 and the second side wall 375 at the opening of the slot space 376 are also rounded off to reduce stress concentration in the slot space 376.

It should be noted that in the application, the first side wall 373 is perpendicular to the lower surface 311. Limited by the machining process and material, the angle between the first side wall 373 and the lower surface 311 may not be as accurate as 90°. In an actual product, the first side wall 373 may be considered as perpendicular to the lower surface 311 as mentioned in the application as long as the angle between the first side wall 373 and the lower surface 311 ranges from 80° to 110°.

Referring to FIG. 17, it should also be noted that the layout of the slot space 376 on the lower surface is not specifically limited. The slot space 376 may be distributed on the lower surface in an S shape, and the heating wire 35 is arranged in the S-shaped track of the slot space 376. The slot space 376 may also be distributed on the lower surface in the form of a "straight line or a fold line".

In the application, the slot space 376 may be recessed between the upper surface 313 and the lower surface 311, that is, the slot space 376 is drilled in the pad body 31. In this case, the heating wire 35 is arranged in the slot space 376 and closer to the upper surface 313, and the heating effect of the heating wire 35 is better. The slot space 376 may protrude out from the lower surface 311, and in this case, the first side wall 373 and the second side wall 375 protrude out from the lower surface 311.

Further referring to FIGS. 27-29, the heating region 03 further includes a first packaging layer 38 and a second packaging layer 39, wherein the first packaging layer 38 wraps around the periphery of the heating wire 35, the heating wire 35 and first packaging layer 38 are arranged in the slot space 376. The second packaging layer 39 is arranged at the opening of the mounting groove 37, such that a sealed space is defined by the bottom wall 371, the first side wall 373, the second side wall 375 and the second packaging layer 39, and the first packaging layer 38 and the heating wire 35 are arranged in the sealed space.

It should be noted that in some application scenarios of the application, the first packaging layer 38 may be made from silicone, rubber or other flexible materials. The second packaging layer 39 may be made from glue, silicone, rubber or other flexible materials. The first packaging layer 38 and the second packaging layer 39 may reduce partial overheat in the pad body 31, thus prolonging the service life of the pad body 31. Meanwhile, by means of the first packaging layer 38 and the second packaging layer 39, the heating wire 35 will not produce an unpleasant odor (or, an unpleasant odor will be isolated) after being powered on, thus providing good dining experience for customers.

It should be noted that in some embodiments of the application, reinforcing ribs (not shown) are arranged on the lower surface 311 and located between different support pillars 33, and the height of the reinforcing ribs is less than that of the support pillars 33. The reinforcing ribs and the pad body 31 are made from the same material. In use of the heating pad 001, the heating pad 001 is in an expansion and contraction state for a long time due to periodic heating and cooling, so the pad body 31 is likely to partially contract and partially expand, leading to unevenness of the pad body 31 and affecting normal use of the heating pad 001. For example, when the pad body 31 becomes uneven, particularly when the upper surface 313 becomes uneven, food to be heated is likely to spill out, bringing inconvenience to users.

Figure 32:
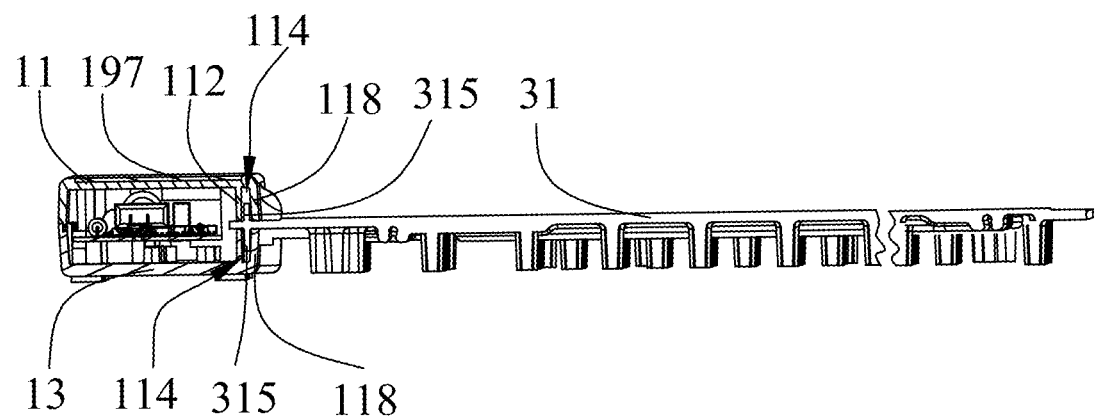
FIG. 32 is a sectional view along E-E in FIG. 20 according to the application.

Refer to FIGS. 20, 23 and 32, wherein FIG. 32 is a sectional view along E-E in FIG. 20 according to the application.

As shown in FIGS. 20, 23 and 32, the pad body 31 of the heating pad 001 further includes at least one waterproof baffle 315, and the waterproof baffle 315 has a height ranging from 1 mm to 10 mm and a thickness ranging from 0.5 mm to 5 mm. The waterproof baffle 315 is approximately perpendicular to the upper surface 313.

Wherein, the upper shell 11 further includes at least one partition 112, and the partition 112 extends downwards from the top wall. The partition 112 is spaced apart from the upper peripheral wall 16, and at least one waterproof groove 14 is formed between the partition 112 and the upper peripheral wall 118. The width of the waterproof groove 114 matches the thickness of the waterproof baffle 315. After the pad body 31 extends into the receiving space by passing through the slot 18, the waterproof baffle 315 is mounted in the waterproof groove 114.

In one embodiment of the application, the pad body 31 of the heating pad 001 includes two waterproof baffles 315, the upper shell 11 includes a partition 112, and the partition 112 extends downwards from the top wall; the lower shell includes a partition 112, the partition 112 extends upwards from the bottom wall 139, and at least one waterproof groove 114 is formed between the partition 112 and the lower peripheral wall 138; and the width of the waterproof groove 114 matches the thickness of the waterproof baffles 315. After the pad body 31 extends into the receiving space by passing through the slot 18, the waterproof baffles 315 are mounted in the waterproof groove 114.

In another embodiment of the application, arc regions are arranged at two ends of the waterproof baffle 315, and a linear region is arranged in the middle of the waterproof baffle 315. Arc regions are arranged at two ends of the waterproof groove 114, and a linear region is arranged in the middle of the waterproof groove 114. The waterproof baffle 315 is mounted in the waterproof groove 114.

In the cleaning process of the heating pad 001, because the waterproof baffle 315 is mounted in the waterproof groove 114, water is unlikely to flow across the waterproof baffle 315 to enter the circuit board 17, thus improving waterproofness. The arc regions at the two ends of the waterproof groove 144 may prevent, to the maximum extent, water from entering the circuit board 17 from the outside.

Figure 33:
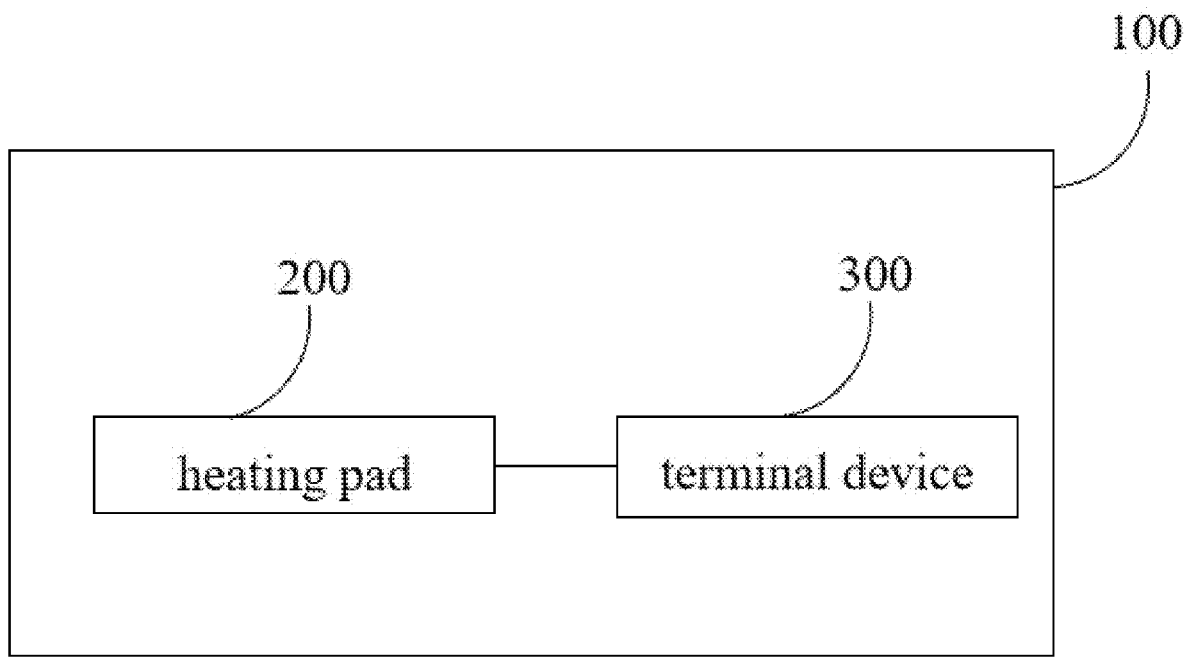
FIG. 33 is a schematic structural diagram of a heating system according to the application.

As shown in FIG. 33 which is a schematic structural diagram of a heating system according to the application, the application may further provide a heating system 100, including a heating pad 200 and a terminal device 300 electrically connected to the heating pad 200 in a wired or wireless manner. Wherein, the heating pad 200 is as described above and will not be detailed here.

"Electrical connection" mentioned in the application may be a physical connection by means of a wire or a wireless connection by means of an electric signal. The electric signal here may be at least one of a current signal, a voltage signal, a resistance signal, a Bluetooth signal, a WiFi signal and other electric signals. The terminal device 300 may be at least one of a computer, a mobile phone, an iPad, a smart watch and a smart ring.

Descriptive terms such as "approximately", "about" and "close to" mentioned in the application means that a value referred to may fluctuate within a range of +20% with respect to a standard value.

"At least one" mentioned in the application refers to the existence of at least one of multiple cases or the co-existence of multiple cases. For example, "at least one of A, B and C" includes the existence of A, the existence of B, the existence of C, the co-existence of A and B, the co-existence of A and C, and all other possible combinations, which will not be enumerated here.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A or B", unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The embodiments of the application are described above. It should be noted here that for those ordinarily skilled in the art, improvements may be made without departing from the inventive concept of the application, and all these improvements should fall within the protection scope of the application.

What is claimed is:

1. A heating pad, comprising:
an operation region, wherein the operation region comprises:
an upper shell, the upper shell being a shell structure provided with a through-hole;
a lower shell, the lower shell being arranged opposite to the upper shell, and the upper shell and the lower shell being fixedly connected to form a receiving space;
a circuit board, the circuit board being mounted in the receiving space;
an operation interface, the operation interface being arranged at the through-hole of the upper shell and electrically connected to the circuit board; and
a heating region, wherein the operation region is fixedly connected to the heating region, and the heating region comprises:
a pad body, the pad body being made from a flexible material and comprising an upper surface and a lower surface, and the upper surface and the lower surface being arranged opposite to each other;
a plurality of support pillars, the plurality of support pillars being arranged on the lower surface, extending out from the lower surface and having a height greater than a thickness of the pad body; and
a heating wire, the heating wire being mounted on the lower surface, gaps being formed between the plurality of support pillars, and the heating wire being arranged in the gaps;
wherein the operation interface sends an electric signal to the circuit board to control a temperature of the heating wire to reach a preset desired temperature;
wherein the heating region further comprises:
a mounting groove provided with an opening, wherein the mounting groove is located in the gaps, and the mounting groove comprises:
a bottom wall;
a first side wall; and
a second side wall, the second side wall being arranged opposite to the first side wall;
wherein the bottom wall, the first side wall and the second side wall are integrally, and a slot space is defined by the bottom wall, the first side wall and the second side wall;
wherein the heating wire is arranged in the slot space.

2. The heating pad according to claim 1, wherein a height of the support pillars is at least twice the thickness of the pad body.

3. The heating pad according to claim 1, wherein the bottom wall is arranged between the upper surface and the lower surface.

4. The heating pad according to claim 1, wherein the bottom wall protrudes out from the lower surface.

5. The heating pad according to claim 1, wherein the heating region further comprises:
a first packaging layer, wherein the first packaging layer wraps around a periphery of the heating wire, and the heating wire and the first packaging layer are arranged in the slot space; and
a second packaging layer, wherein the second packaging layer is arranged at the opening of the mounting groove, such that a sealed space is defined by the bottom wall, the first side wall, the second side wall and the second packaging layer; and the first packaging layer and the heating wire are arranged in the sealed space.

6. The heating pad according to claim 1, wherein the heating region further comprises:
an insulation and heat-conduction layer, the insulation and heat-conduction layer wrapping around the heating wire; and
a glue filler, the glue filler being poured into the slot space and configured to package the heating wire and the insulation and heat-conduction layer in the slot space;
wherein a height of the first side wall is approximately the same as a height of the second side wall;
a height of the glue filler is greater than the height of the first side wall and is also greater than the height of the second side wall;
the heating wire is made from a heating metal.

7. The heating pad according to claim 5 wherein the heating wire is cylindrical in shape, a diameter of the heating wire is less than a width of the opening, and a difference between the diameter and the width is at least 1 mm.

8. The heating pad according to claim 5, wherein in an extension direction from the bottom wall to the opening, a distance between the first side wall and the second side wall decreases gradually.

9. The heating pad according to claim 5, wherein the first side wall is perpendicular to the lower surface, an included angle between the second side wall and the lower surface is an acute angle, and in an extension direction from the bottom wall to the opening, a distance between the first side wall and the second side wall decreases gradually.

10. The heating pad according to claim 1, wherein the upper surface comprises:
a central region; and
a marginal region;
wherein the central region and the marginal region form the upper surface jointly, a height difference exists between the central region and the marginal region, the central region is higher than the marginal region, and the height difference between the central region and the marginal region is 0.1-1 mm.

11. The heating pad according to claim 1, wherein the circuit board comprises:
   a power module, configured to trigger a switch to enable a circuit to reach a second temperature;
   a processing module, configured to preset the desired temperature, determine whether the second temperature is identical with the desired temperature, enable the circuit to be further heated to further increase the second temperature in a case where the second temperature is lower than the desired temperature, and stop heating the heating wire in a case where the second temperature is higher than or equal to the desired temperature; and
   a circuit substrate, the power module and the processing module being mounted on the circuit substrate, and the power module and the processing module being electrically connected;
   wherein the heating wire is electrically connected to the power module, and the power module supplies power to the heating wire to change the temperature of the heating wire.

12. The heating pad according to claim 11, wherein the circuit board further comprises:
   a display module, electrically connected to the power module and the processing module;
   the display module comprises:
      an indicator light unit;
      a driving unit, configured to drive the indicator light unit; and
      a display unit, the indicator light unit being electrically connected to the display unit;
   wherein the indicator light unit, the driving unit and the display unit are electrically connected.

13. The heating pad according to claim 1, wherein the operation region is elongated and made from a rigid material, the heating region is made from a flexible material, and the heating region is flexibly windable around the operation region and configured to allow the heating pad to be in a cylindrical shape.

14. The heating pad according to claim 1, wherein the support pillars comprise:
   a plurality of proximal support pillars; and
   a plurality of distant support pillars;
   wherein the proximal support pillars and the distant support pillars are arranged on the lower surface and extend out from the lower surface, wherein the proximal support pillars are close to the operation region, and the distant support pillars are away from the operation region;
   a cross-sectional area of the proximal support pillar is greater than a cross-sectional area of the distant support pillar, and a height of the proximal support pillar is approximately the same as a height of the distant support pillar.

15. The heating pad according to claim 1, wherein the operation interface comprises at least one of a button and a display screen.

16. A heating pad, comprising:
   an operation region, wherein the operation region comprises:
      an upper shell, the upper shell being a shell structure provided with a through-hole;
      a lower shell, the lower shell being arranged opposite to the upper shell, and the upper shell and the lower shell being fixedly connected to form a receiving space;
      a circuit board, the circuit board being mounted in the receiving space;
      an operation interface, the operation interface being arranged at the through-hole of the upper shell and electrically connected to the circuit board; and
   a heating region, wherein the operation region is fixedly connected to the heating region, and the heating region comprises:
      a pad body, the pad body being made from a flexible material and comprising an upper surface and a lower surface, and the upper surface and the lower surface being arranged opposite to each other;
      a plurality of support pillars, the plurality of support pillars being arranged on the lower surface, extending out from the lower surface and having a height greater than a thickness of the pad body; and
      a heating wire, the heating wire being mounted on the lower surface, gaps being formed between the plurality of the support pillars, and the heating wire being arranged in the gaps;
   wherein the upper shell comprises:
      an upper peripheral wall; and
      a top wall, the upper peripheral wall and the top wall forming the upper shell;
   wherein the lower shell comprises:
      a lower peripheral wall; and
      a bottom wall, the lower peripheral wall and the bottom wall forming the lower shell;
   the top wall and the bottom wall are arranged opposite to each other, and the upper shell and the lower shell are arranged opposite to each other;
   the upper peripheral wall and the lower peripheral wall form a peripheral wall jointly;
   an upper recess is formed in the top wall, a lower recess is formed in the bottom wall, and the upper recess communicates with the lower recess to form a storage through-hole;
   the storage through-hole comprises an inner wall, and a distance between the inner wall and the peripheral wall is at least 1 mm.

17. The heating pad according to claim 16, further comprising a wire and a wiring terminal, wherein the wiring terminal, the circuit board and the heating wire are electrically connected by means of the wire;
   an upper notch is formed in the upper peripheral wall, a lower notch is formed in the lower peripheral wall, and the upper notch corresponds to the lower notch in position to form a wiring port;
   the wiring terminal is located at the wiring port and configured to be electrically connected to an external power supply.

18. The heating pad according to claim 16, wherein a slot is formed in the upper peripheral wall or the lower peripheral wall, the slot is long and narrow in shape, the pad body, after passing through the slot, extends into the receiving space, and a height of the slot ranges from 1 mm to 20 mm; wherein, the slot is provided with at least one wiring notch, and the heating wire, after passing through the wiring notch, extending into the receiving space.

19. The heating pad according to claim 16, wherein the pad body is provided with at least two mounting holes, the upper shell is provided with at least four upper mounting holes, and the lower shell is provided with at least four lower mounting holes; and when the pad body extends into the receiving space by passing through the slot, the upper mounting holes, the mounting holes and the lower mounting holes correspond to one another in position from top to bottom.

20. A heating pad, comprising:
an operation region, wherein the operation region comprises:
an upper shell, the upper shell being a shell structure provided with a through-hole;
a lower shell, the lower shell being arranged opposite to the upper shell, and the upper shell and the lower shell being fixedly connected to form a receiving space;
a circuit board, the circuit board being mounted in the receiving space;
an operation interface, the operation interface being arranged at the through-hole of the upper shell and electrically connected to the circuit board; and
a heating region, wherein the operation region is fixedly connected to the heating region, and the heating region comprises:
a pad body, the pad body being made from a flexible material and comprising an upper surface and a lower surface, and the upper surface and the lower surface being arranged opposite to each other;
a plurality of support pillars, the plurality of support pillars being arranged on the lower surface, extending out from the lower surface and having a height being greater than a thickness of the pad body; and
a heating wire, the heating wire being mounted on the lower surface, gaps being formed between the plurality of support pillars, and the heating wire being arranged in the gaps;
wherein the pad body further comprises at least one waterproof baffle, with a height ranging from 1 millimeter to 10 millimeters and a thickness of 0.5 millimeters to 5 millimeters;
wherein the lower shell comprises:
a lower peripheral wall; and
a bottom wall, the lower peripheral wall and the bottom wall forming the lower shell;
wherein the upper shell comprises:
an upper peripheral wall; and
a top wall, the upper peripheral wall and the top wall forming the upper shell;
the top wall and the bottom wall are arranged opposite to each other, and the upper shell and the lower shell are arranged opposite to each other;
the upper shell further comprises at least one partition, and the partition extends downwards from the top wall;
the partition is spaced apart from the upper peripheral wall, and at least one waterproof groove is formed between the partition and the upper peripheral wall;

a slot is formed in the upper peripheral wall or the lower peripheral wall, the slot is long and narrow, the pad body extends into the receiving space by passing through the slot, and the waterproof baffle is mounted in the waterproof groove.

21. A heating system, comprising:
a heating pad, wherein the heating pad comprises:
an operation region, wherein the operation region comprises:
an upper shell, the upper shell being a shell structure provided with a through-hole;
a lower shell, the lower shell being arranged opposite to the upper shell, and the upper shell and the lower shell being fixedly connected to form a receiving space;
a circuit board, the circuit board being mounted in the receiving space;
an operation interface, the operation interface being arranged at the through-hole and electrically connected to the circuit board; and
a heating region, wherein the operation region is fixedly connected to the heating region, and the heating region comprises:
a pad body, the pad body being made from a flexible material and comprising an upper surface and a lower surface, and the upper surface and the lower surface being arranged opposite to each other;
a plurality of support pillars, the plurality of support pillars being arranged on the lower surface, extending out from the lower surface and having a height greater than a thickness of the pad body; and
a heating wire, the heating wire being mounted on the lower surface, gaps being formed between the plurality of the support pillars, and the heating wire being arranged in the gaps;
the operation interface sending an electric signal to the circuit board to control a temperature of the heating wire to reach a desired temperature; and
a terminal device, electrically connected to the heating pad in a wired or wireless manner;
wherein the heating region further comprises:
a mounting groove provided with opening, wherein the mounting groove is located in the gaps, and the mounting groove comprises:
a bottom wall;
a first side wall; and
a second side wall, the second side wall being arranged opposite to the first side wall;
wherein the bottom wall, the first side wall and the second side wall are designed integrally, and a slot space is defined by the bottom wall, the first side wall and the second side wall;
wherein the heating wire is arranged in the slot space.

* * * * *